(12) United States Patent
Horio

(10) Patent No.: US 8,942,160 B2
(45) Date of Patent: Jan. 27, 2015

(54) COMMUNICATION SYSTEM, COMMUNICATION APPARATUS, AND DATA TRANSMISSION METHOD

(75) Inventor: Daisuke Horio, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 885 days.

(21) Appl. No.: 12/418,393

(22) Filed: Apr. 3, 2009

(65) Prior Publication Data

US 2009/0252142 A1 Oct. 8, 2009

(30) Foreign Application Priority Data

Apr. 7, 2008 (JP) ................................. 2008-099804

(51) Int. Cl.
*H04B 7/204* (2006.01)
*H04L 12/28* (2006.01)
*H04W 72/08* (2009.01)
*H04L 1/02* (2006.01)
*H04L 1/08* (2006.01)

(52) U.S. Cl.
CPC ............... *H04W 72/085* (2013.01); *H04L 1/02* (2013.01); *H04L 1/08* (2013.01)
USPC .......................... 370/319; 370/395.4; 370/492

(58) Field of Classification Search
None
See application file for complete search history.

(56) References Cited

U.S. PATENT DOCUMENTS

| | | | |
|---|---|---|---|
| 5,477,539 A | 12/1995 | Brown | |
| 6,690,657 B1 | 2/2004 | Lau et al. | |
| 6,744,823 B1 | 6/2004 | Kamemura et al. | |
| 7,286,610 B2 | 10/2007 | Kamemura et al. | |
| 7,286,611 B2 | 10/2007 | Kamemura et al. | |
| 7,606,205 B2 | 10/2009 | Ranta-Aho et al. | |
| 8,010,044 B2 | 8/2011 | Okuda | ............................ 455/15 |
| 2003/0179756 A1 | 9/2003 | Cain | |
| 2005/0124370 A1 | 6/2005 | Nanda | |
| 2005/0148297 A1 | 7/2005 | Lu et al. | |
| 2006/0018286 A1* | 1/2006 | Ozeki et al. | .................... 370/334 |

(Continued)

FOREIGN PATENT DOCUMENTS

| | | |
|---|---|---|
| JP | 7-74697 A | 3/1995 |
| JP | 11-274994 | 10/1999 |

(Continued)

OTHER PUBLICATIONS

Ofuji Yoshiaki et al, "Investigations on Packet Scheduling Exploiting Frequency Selectivity in Uplink Radio Access", Proceedings of the Society Conference of IEICE Communication vol. 1, pp. 451, 2005.
European Search Report dated May 8, 2013 for EP 09004459.5.

*Primary Examiner* — Yemane Mesfin
*Assistant Examiner* — Christine Duong
(74) *Attorney, Agent, or Firm* — Fitzpatrick, Cella, Harper & Scinto

(57) ABSTRACT

More than one communication device that is to simultaneously transmit identical data through multiple data transmissions using different radio wave multiplex types is determined based on the link qualities of a plurality of communication devices. Then the multiple data transmissions are made by transmitting the identical data with synchronized timings at the determined communication apparatuses. The link qualities are determined by measuring received signal intensities, bit error rates, or frame error rates at the respective communication devices at the time of the multiple data transmissions using two radio wave multiplex types orthogonal to each other.

14 Claims, 20 Drawing Sheets

(56) References Cited

U.S. PATENT DOCUMENTS

| | | |
|---|---|---|
| 2006/0233359 A1* | 10/2006 | Jung et al. ............... 380/30 |
| 2007/0035463 A1 | 2/2007 | Hirabayashi |
| 2007/0041345 A1* | 2/2007 | Yarvis et al. ............. 370/331 |
| 2007/0060158 A1 | 3/2007 | Medepalli et al. |
| 2007/0135151 A1* | 6/2007 | Dendy ..................... 455/517 |
| 2007/0202904 A1 | 8/2007 | Cheng et al. |
| 2010/0278136 A1* | 11/2010 | Oyman et al. ............ 370/330 |
| 2011/0151773 A1 | 6/2011 | Okuda ..................... 455/9 |

FOREIGN PATENT DOCUMENTS

| | | |
|---|---|---|
| JP | 2001-86051 | 3/2001 |
| JP | 2005-516472 A | 6/2005 |
| JP | 2006-504322 A | 2/2006 |
| JP | 2008-48202 | 2/2008 |
| JP | 2008-53998 A | 3/2008 |

* cited by examiner

FIG. 6A

| NODE NAME | POLARIZATION | LINK QUALITY |
|---|---|---|
| CONTROL STATION | H | 7 |
| | V | 8 |
| NODE 101 | H | ... |
| | V | ... |
| NODE 102 | H | 5 |
| | V | 9 |
| NODE 103 | H | 4 |
| | V | 3 |
| NODE 104 | H | 3 |
| | V | 6 |
| NODE 105 | H | 4 |
| | V | 2 |
| NODE 106 | H | 2 |
| | V | 1 |
| ... | | |

601 — NODE NAME
602 — POLARIZATION
603 — LINK QUALITY

FIG. 6B

| NODE NAME | POLARIZATION | LINK QUALITY |
|---|---|---|
| CONTROL STATION | H | 6 |
| | V | 4 |
| NODE 101 | H | 5 |
| | V | 9 |
| NODE 102 | H | ... |
| | V | ... |
| NODE 103 | H | 5 |
| | V | 0 |
| NODE 104 | H | 4 |
| | V | 5 |
| NODE 105 | H | 4 |
| | V | 6 |
| NODE 106 | H | 5 |
| | V | 7 |
| ... | | |

FIG. 6C

| NODE NAME | POLARIZATION | LINK QUALITY |
|---|---|---|
| CONTROL STATION | H | 7 |
| | V | 6 |
| NODE 101 | H | 4 |
| | V | 1 |
| NODE 102 | H | 5 |
| | V | 4 |
| NODE 103 | H | 8 |
| | V | 8 |
| NODE 104 | H | ... |
| | V | ... |
| NODE 105 | H | 4 |
| | V | 3 |
| NODE 106 | H | 8 |
| | V | 7 |
| ... | | |

FIG. 11A

| NODE NAME | POLARIZATION | LINK QUALITY |
|---|---|---|
| CONTROL STATION | H | 7 |
|  | V | 8 |
| NODE 101 | H | ... |
|  | V | ... |
| NODE 102 | H | 5 |
|  | V | 9 |
| NODE 103 | H | 4 |
|  | V | 3 |
| NODE 104 | H | 3 |
|  | V | 6 |
| NODE 105 | H | 4 |
|  | V | 2 |
| NODE 106 | H | 2 |
|  | V | 1 |
| ... |  |  |

FIG. 11B

| NODE NAME | POLARIZATION | LINK QUALITY |
|---|---|---|
| CONTROL STATION | H | 6 |
|  | V | 4 |
| NODE 101 | H | 5 |
|  | V | 9 |
| NODE 102 | H | ... |
|  | V | ... |
| NODE 103 | H | 5 |
|  | V | 0 |
| NODE 104 | H | 4 |
|  | V | 5 |
| NODE 105 | H | 4 |
|  | V | 6 |
| NODE 106 | H | 5 |
|  | V | 7 |
| ... |  |  |

FIG. 11C

| NODE NAME | POLARIZATION | LINK QUALITY |
|---|---|---|
| CONTROL STATION | H | 7 |
|  | V | 6 |
| NODE 101 | H | 4 |
|  | V | 1 |
| NODE 102 | H | 5 |
|  | V | 4 |
| NODE 103 | H | 8 |
|  | V | 8 |
| NODE 104 | H | ... |
|  | V | ... |
| NODE 105 | H | 4 |
|  | V | 3 |
| NODE 106 | H | 8 |
|  | V | 7 |
| ... |  |  |

FIG. 14

| NODE NAME | TRANSMITTING POLARIZATION | RECEIVING POLARIZATION |
|---|---|---|
| NODE 1 | V | - |
| NODE 2 | - | V |
| NODE 3 | - | H |
| NODE 4 | H | - |
| NODE 5 | - | H |
| NODE 6 | - | H |
| NODE 7 | - | H |
| NODE 8 | - | V |

1401 / 1402 / 1403

| NODE NAME | TRANSMITTING POLARIZATION | RECEIVING POLARIZATION |
|---|---|---|
| NODE 1 | - | H |
| NODE 2 | H | - |
| NODE 3 | - | V |
| NODE 4 | - | V |
| NODE 5 | V | - |
| NODE 6 | - | H |
| NODE 7 | - | H |
| NODE 8 | - | V |

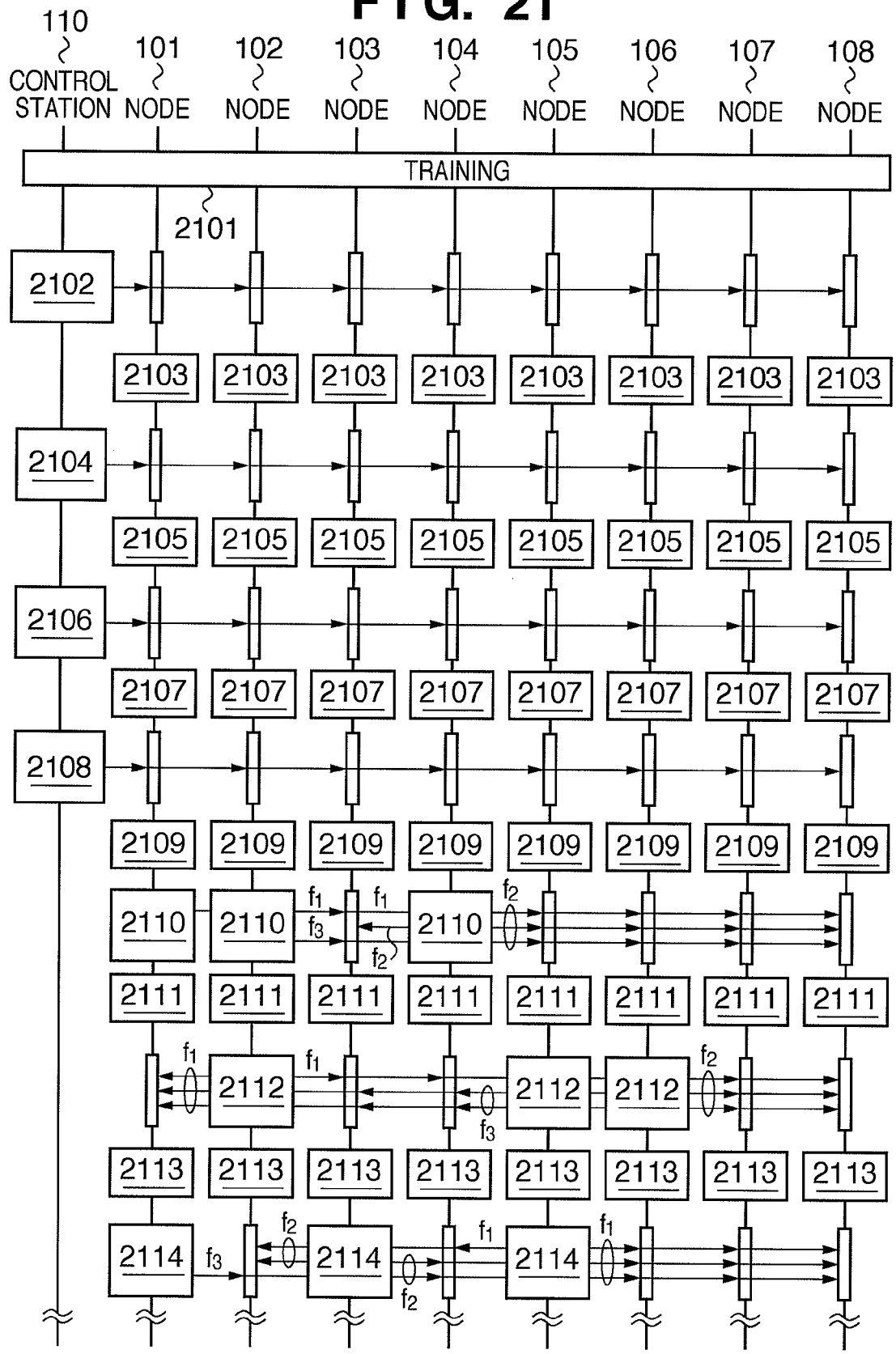

COMMUNICATION SYSTEM, COMMUNICATION APPARATUS, AND DATA TRANSMISSION METHOD

BACKGROUND OF THE INVENTION

1. Field of the Invention

The present invention relates to a communication system comprised of a plurality of communication apparatuses, the communication apparatus, and a data transmission method.

2. Description of the Related Art

In recent years, streamed data comprised of video signals and audio signals are transmitted using radio communication techniques at home theaters and so on. Because of this, in communication systems each comprised of communication terminals each associated with plural speakers and a control station that controls the terminals, a technique is required by which high-quality video images and musical sounds can be reproduced without interruption and jitter such as communication delay.

In order to satisfy such a requirement, a proposal has been heretofore made that a communication system can be used in which to increase its communication reliability all communication devices within a wireless network transmit identical data through redundant communication paths.

Moreover, a method has been proposed in which to achieve a high communication rate through an increase in radio signal intensity a transmission side transmits to many reception sides by using a wide-band directional antenna and the reception sides direct directional beams to the transmission side by using narrow-band directional antennas.

On the other hand, in order to maintain good communication quality at all times through redundant transmission, polarization-, code-, or frequency-multiplex transmission is used. For example, a technique is devised by which good communication quality is maintained even when there is physical shielding in the communication path. In such a technique, communication shielding is avoided by redundantly transmitting identical data at plural senders through polarization-multiplex transmission and using polarization diversity reception at receiving terminals (see, for examples, Japanese Patent Laid-Open No. 11-274994).

Furthermore, as another example, there is a method in which at a redundant structure including a radio line where communications are carried out with a reserve line when an active line has been disconnected, different polarizations of the same frequency band are assigned thereto. In the above case, by using the transmission line comprised of the active line and the reserve line to which the different polarizations of the same frequency band are assigned, a state is brought about in which when one of both lines has been disconnected, the other line takes the place thereof and, thus, the efficiency of frequency resource usage is enhanced (see, for example, Japanese Patent Laid-Open No. 2001-86051).

However, in a communication system in which a control station and a plurality of communication devices perform broadcast communications, when the control station and the communication devices have antenna directivity, sufficient link quality cannot be obtained depending on the arrangement of the devices and, thus, communication between them has not been established at times.

Therefore there is a need to increase the number of communications with the other communication devices within the system to increase redundancy and further increase communication reliability until all the communication devices within the communication system can surely receive identical data at a sufficient link quality. However, since there is a trade-off relationship between the reliability of communication lines and the number of communications, such a method is inefficient. And further, as the number of communications increases in order to increase the reliability, communication time lengthens.

SUMMARY OF THE INVENTION

The present invention provides a communication system, which enhances communication efficiency to be keeping improvement of the reliability of communications.

According to an aspect of the invention, there is provided a communication system comprised of a plurality of communication apparatuses comprising: a first determination unit configured to determine, based on link qualities of the respective communication apparatuses, a plurality of the communication apparatuses to simultaneously transmit data through multiple data transmissions using different radio wave multiplex types; and a transmission unit configured to perform the multiple data transmissions with synchronized timings by the communication apparatuses determined by the first determination unit.

According to another aspect of the invention, there is provided a communication apparatus in a communication system comprised of a plurality of communication apparatuses, comprising: a determination unit configured to determine, based on link qualities of the respective communication apparatuses, a plurality of communication apparatuses to simultaneously transmit data through multiple data transmissions using different radio wave multiplex types; and a notification unit configured to notify the communication apparatuses determined by the determination unit of the radio wave multiplex types for use in the multiple data transmissions.

According to still another aspect of the invention, there is provided a data transmitting method used in a communication system comprised of a plurality of communication apparatuses, comprising: determining, based on link qualities of the respective communication apparatuses, a plurality of communication apparatuses to simultaneously transmit data through multiple data transmissions using different radio wave multiplex types; and performing the multiple data transmissions with a timing with which the plurality of communication apparatuses determined in the determining step synchronize with each other.

According to yet another aspect of the invention, there is provided a data transmitting method of a communication apparatus in a communication system comprised of a plurality of communication apparatuses, comprising: determining, based on link qualities of the respective communication apparatuses, a plurality of communication apparatuses to simultaneously transmit data through multiple data transmissions using different radio wave multiplex types; and notifying the communication apparatuses determined in the determining step of a radio wave multiplex type used for the multiple data transmissions.

Further features of the present invention will become apparent from the following description of exemplary embodiments with reference to the attached drawings.

BRIEF DESCRIPTION OF THE DRAWINGS

FIGS. 6A to 6C are examples of connection lists shared by respective nodes and the control station 110.

FIGS. 11A to 11C are examples of connection lists used to select the node-b group according to the first embodiment.

FIG. 14 represents the lists of transmitting polarization types and receiving polarization types used at time slots obtained as a result of training.

FIG. 21 shows an operation sequence performed by the control station and the nodes until they finish data transmissions according to the third embodiment.

DESCRIPTION OF THE EMBODIMENTS

In the following, best modes for carrying out the present invention will be described in detail with reference to the drawings. Incidentally, in the embodiments will be described methods for simultaneously covering a place, where data being transmitted from a communication device cannot be received, by other communication devices through the application of a multiple data transmitting technique using different polarizations, codes, or frequencies as a type of multiplexing of radio waves (radio wave multiplex type) to the communication system.

First Embodiment

Figure 1:
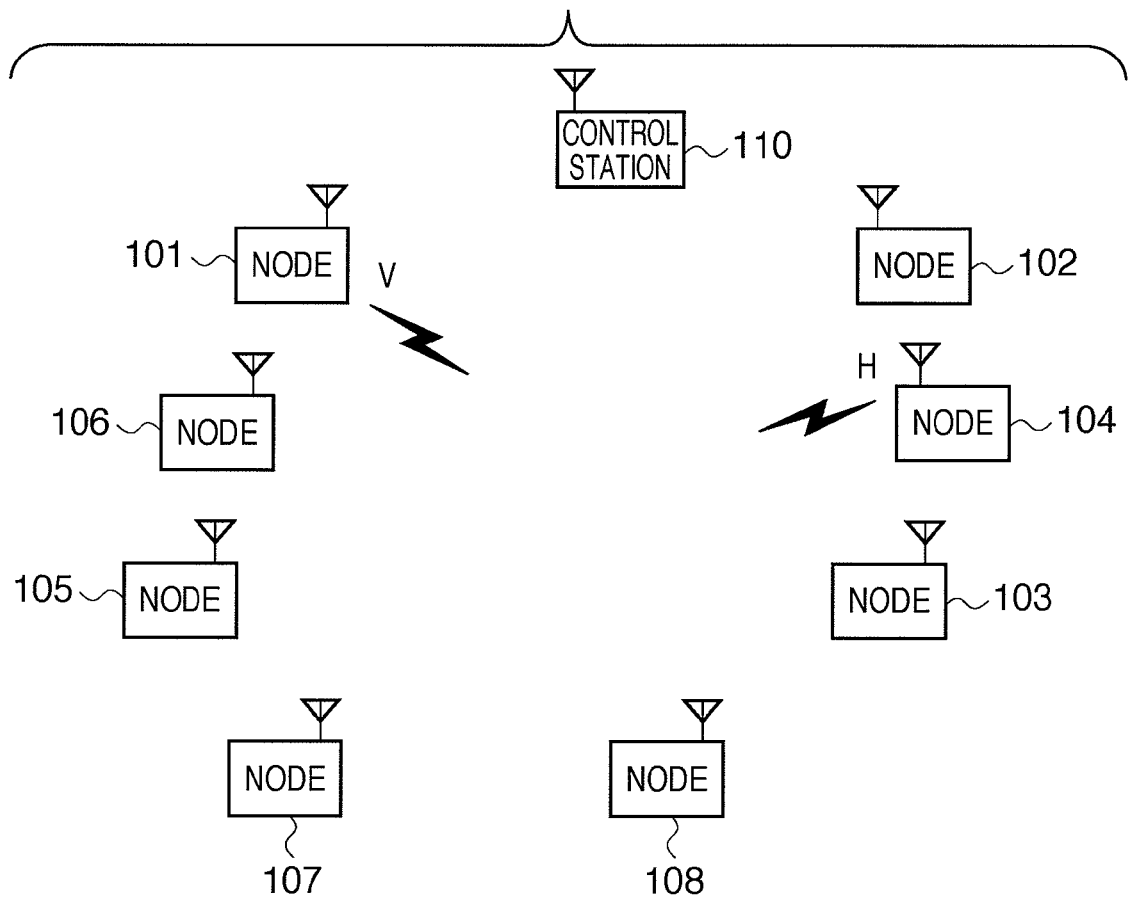
FIG. 1 is an illustration of an exemplary structure of a network according to a first embodiment.

FIG. 1 is an illustration of an exemplary structure of a network according to a first embodiment. In FIG. 1, reference numerals 101 to 108 are second communication devices (nodes). Reference numeral 110 is a first communication device (control station). The control station 110 transmits to and receives from the nodes 101 to 108 streamed data such as control signals, video signals, and audio signals by radio.

In the network of FIG. 1, the control station 110 receives streamed data such as video signals and audio signals from an external device via a wire cable, and then broadcasts the data to the nodes 101 to 108 in the network. In order to make the streamed data transmission, an OFDM communication system or the like is used as a high-speed communication system; and besides as a primary modulation scheme, a communication system such as QPSK, 8 PSK, or 16 QAM is used.

Incidentally, OFDM is an abbreviation for orthogonal frequency division multiplexing; QPSK is an abbreviation for quadrature phase shift keying; 8 PSK is an abbreviation for 8-phase shift keying; and 16 QAM is an abbreviation for 16-quadrature amplitude modulation.

Since the OFDM communication system and a communication system such as QPSK, 8 PSK, or 16 QAM used for the primary modulation are well-known techniques, their detailed explanations will be omitted.

The nodes 101 to 108 transmit to and receive from the control station 110 control signals and control data by radio. And further, each node receives streamed data such as video signals from the control station 110 and the other nodes by radio, and transmits the received streamed data by radio.

In order not to cause any delay in transmitting the streamed data, the control station 110 determines the order of time-division transmissions from the nodes after topologies have been formed between the control station 110 and the nodes 101 to 108. Thereafter, each node transmits the data at a time slot allocated to each node in the determined transmission order.

Here, the term time slot refers to a time period during which each node transmits the streamed data. The transmission-side nodes transmit the streamed data at a predetermined slot period.

The nodes make redundant transmissions by successively transmitting the received streamed data to the other nodes in the order determined by the control station 110. Each node selects the highest-reliability data from the same pieces of streamed data received plural times to display the video and reproduce the audio signals.

As described above, streamed data is transmitted without transmission delay after topologies have been formed between the control station 110 and the nodes 101 to 108.

However, in order to form such topologies, it is necessary for each node to reliably receive control data, such as the order of transmission from itself, a transmission wave multiplex type, and its reception wave type, transmitted from the control station 110. Because of this, control data is transmitted by using a high-reliability communication system using a RTS/CTS (request to send/clear to send) scheme. Incidentally, since the communication system using the RTS/CTS scheme is a well-known technique, a detailed explanation thereof will be omitted.

Moreover, data transmission is reliably made by using a low-speed data transmission method in which noise immunity is exhibited to a certain extent, such as DBPSK (differential binary phase shift keying), as a carrier modulation scheme. Here, since DBPSK is also a well-known technique as is clear from the standard of an IEEE802.11 system for wireless LANs, its explanation will be omitted. Also, the details of a method for determining the order of transmissions from the nodes at the control station 110 will be described later.

Figure 2:
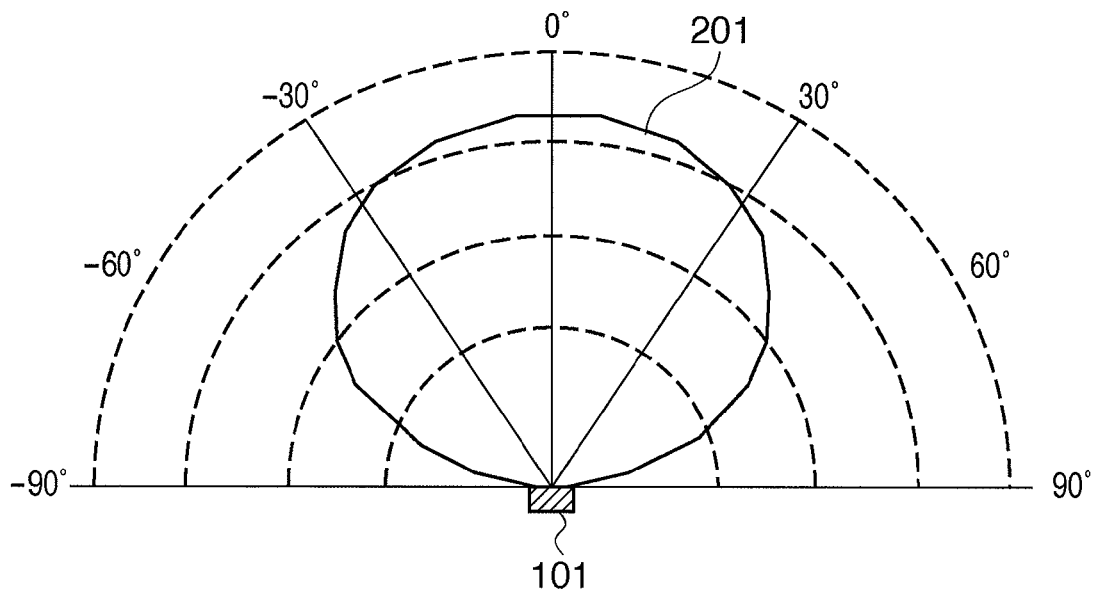
FIG. 2 is a diagrammatic illustration of antenna directivity at a node 101.

Next, a case will be described below where after the control station 110 has first transmitted original streamed data, the streamed data is transmitted with slot timing four times so that all the nodes can receive the data. Each node has specific antenna directivity, and broadcasts streamed data to the other nodes. FIG. 2 is a diagrammatic illustration of antenna directivity at the node 101. Incidentally, it is assumed that the other nodes 102 to 108 and the control station 110 also have the same antenna directivity as that of node 101.

Figure 3:
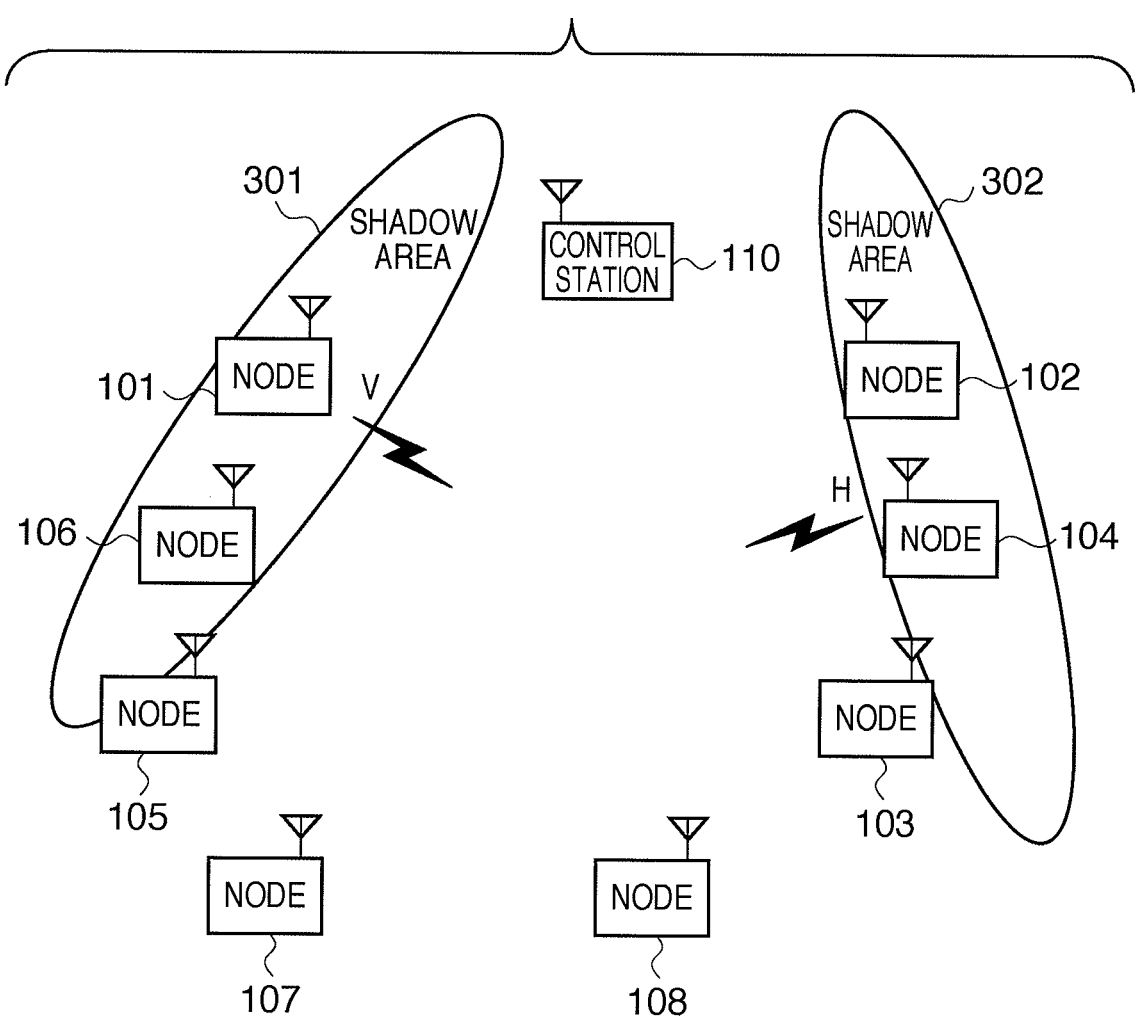
FIG. 3 is a schematic illustration of shadow areas resulting from simultaneous data transmissions using different polarizations from the node 101 and a node 104.

FIG. 3 is a schematic illustration of shadow areas resulting from when the nodes 101 and 104 have simultaneously transmitted data with different polarizations. In FIG. 3, since the node 101 has only antenna directivity 201 shown in FIG. 2, there are places beyond the reach of the radio waves and places where the radio wave intensity is very low. And further, at places a long way in the transmitting operation from the nodes and in a state in which the received signal intensities are low without regard to antenna directivity, the radio waves are weak and, therefore, places are formed where no communication can be conducted. These places are collectively defined as the shadow area 301.

In FIG. 3, when the node 101 transmits streamed data, the other nodes within the shadow area 301 cannot communicate with the node 101. For example, in FIG. 3, when the nodes 101 and 104 have attempted data transmissions as shown in FIG. 3, the node 106 within the shadow area 301 cannot communicate with the node 101. And further, the node 102, which is located within a shadow area 302 resulting from the placement of the node 104, cannot communicate with the node 104. Still further, there is the possibility that the node 101 cannot communicate with the node 108 being a long way from itself, and the same applies for the relationship between the node 104 and the node 107. Because of this, redundant transmissions of the streamed data are made with different polarizations by the other nodes.

Figure 4:
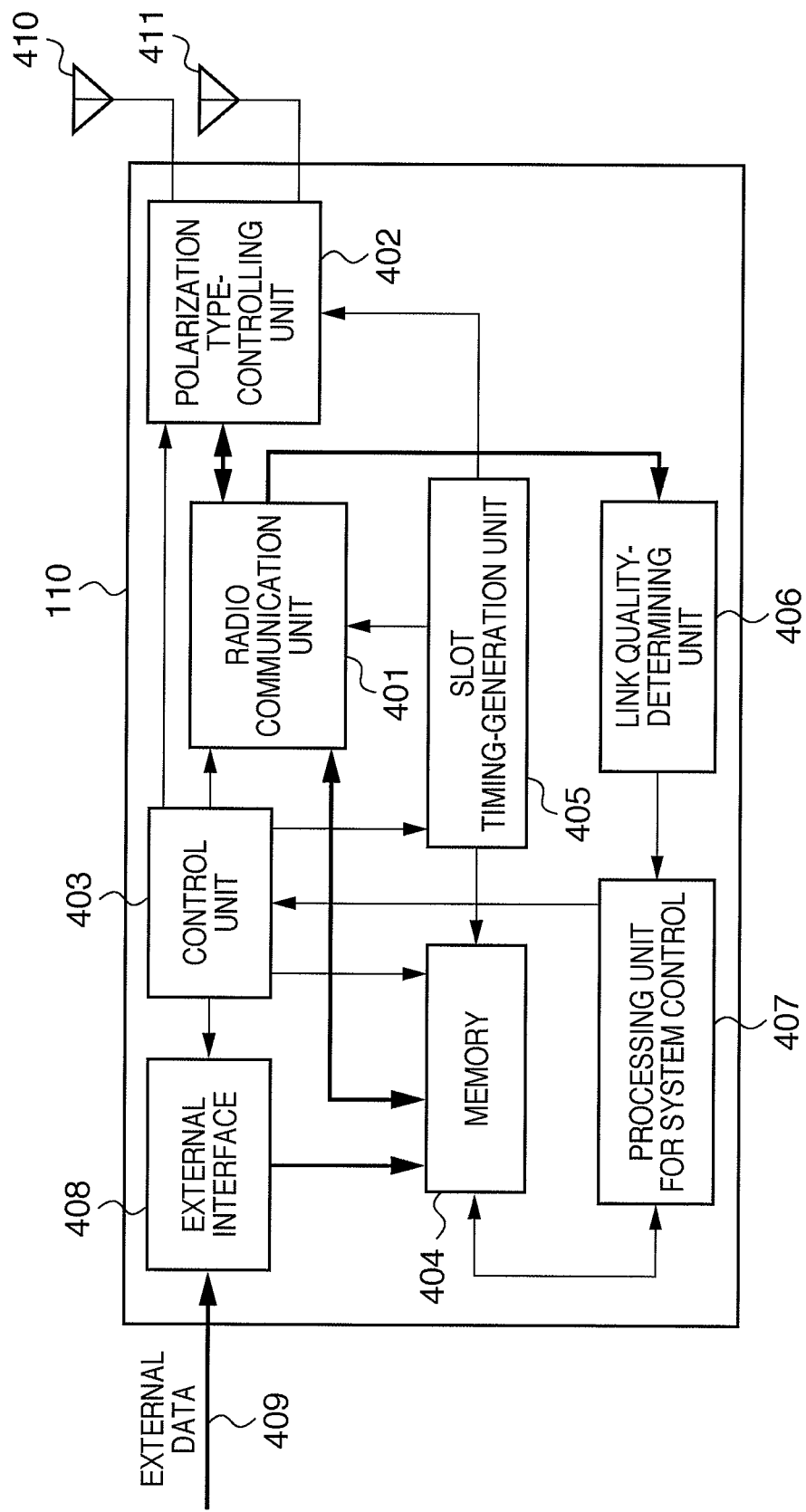
FIG. 4 is a block diagram of an exemplary internal configuration of a control station 110.

FIG. 4 is a block diagram of an exemplary internal configuration of the control station 110. As indicated in FIG. 4, the control station 110 includes a radio communication unit 401, a polarization type-controlling unit 402, a control unit 403, a memory 404, a slot timing-generating unit 405, and a link quality-determining unit 406. The control station 110 further includes a processing unit for system control 407, an external interface 408, an antenna for vertically polarization transmission and reception 410, and an antenna for horizontally polarization transmission and reception 411.

In the above configuration, the control unit 403 transmits control data to the radio communication unit 401, and the radio communication unit 401 modulates the control data into radio signals, following which the signals are transmitted from the antennas 410 and 411.

External data 409, such as a video signal and an audio signal, captured by the external interface 408 is temporarily accumulated in the memory 404. Then the data is sent to the radio communication unit 401 in synchronization with slot timing generated at the slot timing-generating unit 405 on the instructions of the control unit 403. Here, the term slot timing refers to timing with which the nodes transmit data in turn. The radio communication unit 401 modulates the received external data into a radio signal, following which the signal is transmitted with slot timing by radio from the antenna 410 or 411.

The control unit 403 not only controls all the operation of the control station 110 but exercises control to make the radio communication unit 401 transmit data with a slot timing for the control of the synchronization of radio communications with the other nodes. Further, the control unit 403 frames the transmitted data based on terminal information sent from the other nodes as control data. The control station 110 transmits the framed data (hereinafter referred to as "frame data") to the nodes at a time, and then the frame data is redundantly transmitted between the nodes.

The radio communication unit 401 communicates with the nodes 101 to 108 in two types of polarizations orthogonal to each other on the instructions of the control unit 403, and then sends to the link quality-determining unit 406 signals of respective polarization types sent from the respective nodes to the control station 110.

The link quality-determining unit 406 measures the received signal intensities, bit error rates, or frame error rates of the signals sent from the nodes 101 to 108, quantifies the results of the measurement, and then sends the quantified to the processing unit for system control 407 as link qualities. Here, the term link quality refers to a value found based on the measurement of the received signal intensity, bit error rate, or frame error rate of each signal sent from each node to the control unit 110 at the time of communications between the control unit 110 and the nodes 101 to 108.

The processing unit for system control 407 lists the link quality of each node to make a connection list, and then sends the list to the memory 404; the connection lists are stored in the memory 404. Like the control station 110, each node makes a connection list; the radio communication unit 401 receives from the nodes the lists of the connections made between them based on the polarization types, and then the connection lists are stored in the memory 404.

The processing unit for system control 407 refers to the connection lists in the memory 404, determines the order of transmissions from the nodes to transmit with, and concurrently determines the nodes to transmit with in order to cover the nodes within the shadow area resulting from the placement of the nodes to transmit with.

In the memory 404, the predetermined thresholds of the link qualities used to determine the order of the transmissions from the nodes to transmit with are stored.

Then the processing unit for system control 407 sends to the control unit 403 data on the determined order of the transmissions from the nodes, and the control unit 403 sends the transmission order data to the radio communication unit 401. Thereafter, the radio communication unit 401 transmits the transmission order data to each node with a timing generated by the slot timing-generating unit 405.

The polarization type-controlling unit 402 switches between the antennas 410 and 411 with a slot timing generated by the slot timing-generating unit 405 on the instructions of the control unit 403.

Figure 5:
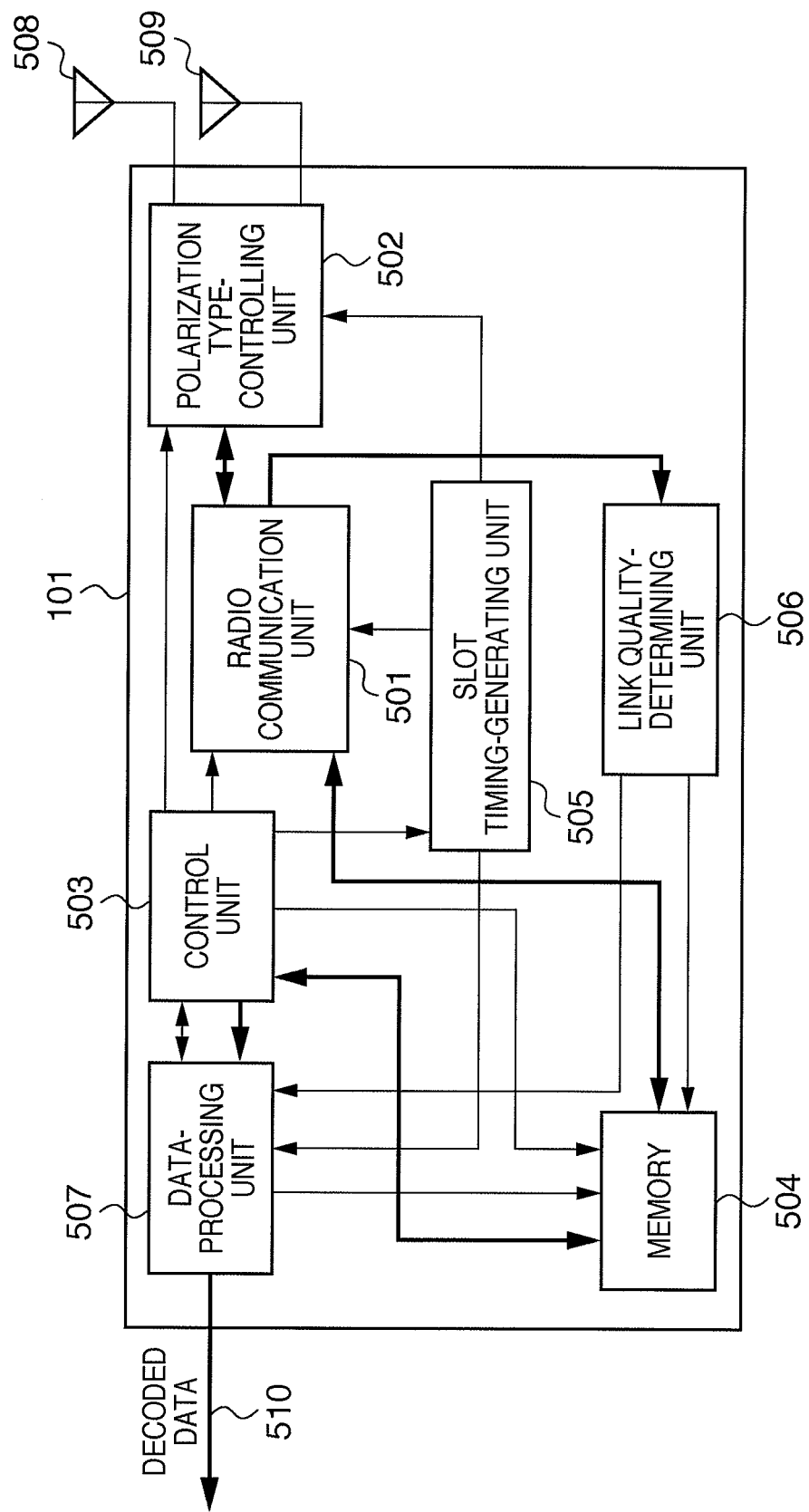
FIG. 5 is a block diagram of an exemplary internal configuration of the node 101.

FIG. 5 is a block diagram of an exemplary internal configuration of the node 101. Incidentally, since the internal configurations of the nodes 102 to 108 are also the same as that of the node 101, the following operation is described by exemplifying the node 101.

As shown in FIG. 5, the node 101 includes a radio communication unit 501, a polarization type-controlling unit 502, a control unit 503, a memory 504, a slot timing-generating unit 505, and a link quality-determining unit 506. The node 101 further includes a data-processing unit 507, an antenna for vertically polarization transmission and reception 508, and an antenna for horizontally polarization transmission and reception 509.

In the above configuration, the radio communication unit 501 sends received streamed data to the memory 504. At the time of the transmission or reception of data, the polarization type-controlling unit 502 switches between the antennas 508 and 509 with a slot timing generated by the slot timing-generating unit 505 on the instructions of the control unit 503.

The control unit 503 selects data for the node 101 itself from received data accumulated in the memory 504, the data-processing unit 507 decodes the selected data, and then the decoded data 510 is output. Based on the video and audio data 510 decoded at the data-processing unit 507, the video is displayed and the audio is reproduced.

Moreover, the received data accumulated in the memory 504 is sent to the radio communication unit 501 on the instructions of the control unit 503, following which the data is transmitted by radio with a timing generated at the slot timing-generating unit 505.

Furthermore, the radio communication unit 501 communicates with the other nodes 102 to 108 and the control station 110 in two types of polarizations orthogonal to each other on the instructions of the control unit 503, and sends received data on the respective polarization types to the link quality-determining unit 506. The link quality-determining unit 506 measures the received signal intensities, bit error rates, or frame error rates of the received signals and then sends the results of this measurement to the data-processing unit 507 as link qualities.

The data-processing unit 507 lists the link qualities of the nodes, makes connection lists, and stores the contents of the lists in the memory 504; the memory 504 carries the contents.

The radio communication unit 501 receives the lists of connections between not only the other nodes 102 to 108 but the other nodes 102 to 108 and the control station 110 made based on their polarization types from them, and stores the contents of the lists in the memory 504.

FIGS. 6A to 6C shows examples of the connection lists representing relationships between not only the nodes 101 to 108 but each node and the control station 110. FIGS. 6A to 6C provide the lists of the connections made at the nodes 101, 102, and 104. Although only the three connection lists are shown in these figures, the lists of the connections made at the other five nodes and the control station 110 are also made as a matter of course. Additionally, the letter H denotes a horizontally polarization, and the letter V a vertically polarization.

As shown in FIGS. 6A to 6C, the connection lists each include node names 601, polarizations 602 representing the polarization multiplexing types used, and link qualities 603 brought about between not only the node itself and the other nodes but the node itself and the control station 110. The link qualities 603 refer to the link qualities to one of the nodes, received from the other nodes and the control station 110. For example, according to the connection list for the node 101, that is, FIG. 6A, in the case where the node 101 receives a signal transmitted by the control station 110 given in the node name 601 column by using a vertically polarization as a polarization 602, its link quality 603 is "8".

Figure 7:
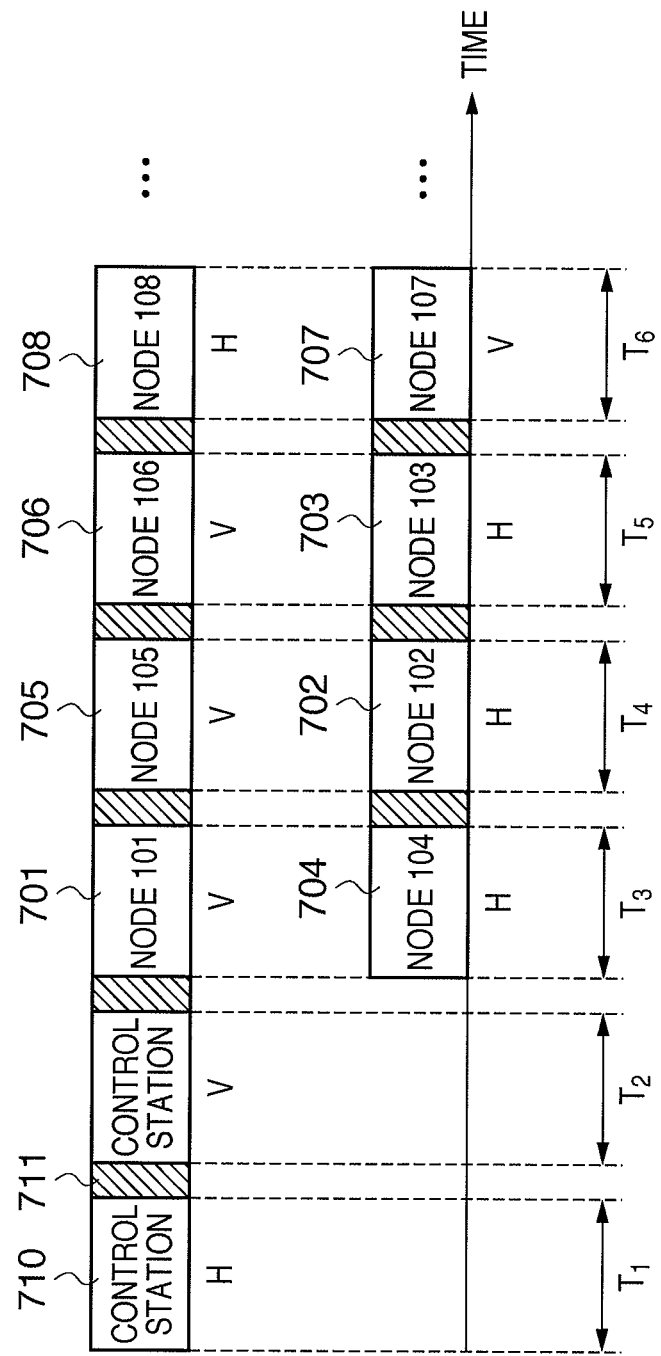
FIG. 7 shows time slots at which the control station 110 and the nodes 101 to 108 transmit data.

FIG. 7 shows time slots at which the control station 110 and the nodes 101 to 108 transmit data. In FIG. 7, reference numeral 710 denotes data transmitted by the control station 110, and reference numerals 701 to 708 denote data transmitted by the nodes 101 to 108. In addition, reference numerals 711 denote time periods during which the nodes 101 to 108 and the control station 110 switch between their antennas at the time of their transmissions and receptions.

A time period comprised of the time slots T1 to T6 in which the individual nodes 101 to 108 redundantly transmit streamed data transmitted from the control station 110 at a time is referred to as a redundant frame. In the first embodiment, one redundant frame comprises two time slots T1 and T2 in which the control station 110 transmits data and four time slots T3 to T6 in which the nodes 101 to 108 transmit data.

In the communication system according to the invention, redundant transmissions of streamed data, such as video data and audio data, are made in one redundant frame. During the time periods 711, the control station 110 and the nodes 101 to 108 control switching between their antennas in accordance with the polarizations that are transmitted or received.

In FIG. 7, the control station 110 transmits data by using a horizontally polarization at the time slot T1, and transmits data by using a vertically polarization at the time slot T2. And further, upper-stage and lower-stage portions at the time slots T3 to T6 indicate simultaneous transmissions from nodes with different polarizations. For example, at the time slot T3, the node 101 transmits data 701, and the node 104 transmits data 704.

In the following, the time slots starting with the time slot T3 in which the control station 110 has transmitted streamed data are referred to herein as a first slot, a second slot . . . an n-th slot.

After the control station 110 has transmitted streamed data by using a horizontally polarization and a vertically polarization, the nodes 101 and 104 first transmit data simultaneously by using different polarizations at the first slot. The nodes 101 and 104 can reliably receive the data from the control station 110, and the node 101 has the best link quality to the control station 110. And further, the nodes other than the nodes 101 and 104 are in a state of reception, that is, are receiving data with polarizations specified by the control station 110. The method for selecting the nodes to simultaneously transmit will be described in detail below.

Then the nodes 105 and 102 transmit simultaneously at a second slot. Thereafter, the specified nodes simultaneously transmit data at respective time slots in turn in the transmission order determined by the control station 110.

Figure 8:
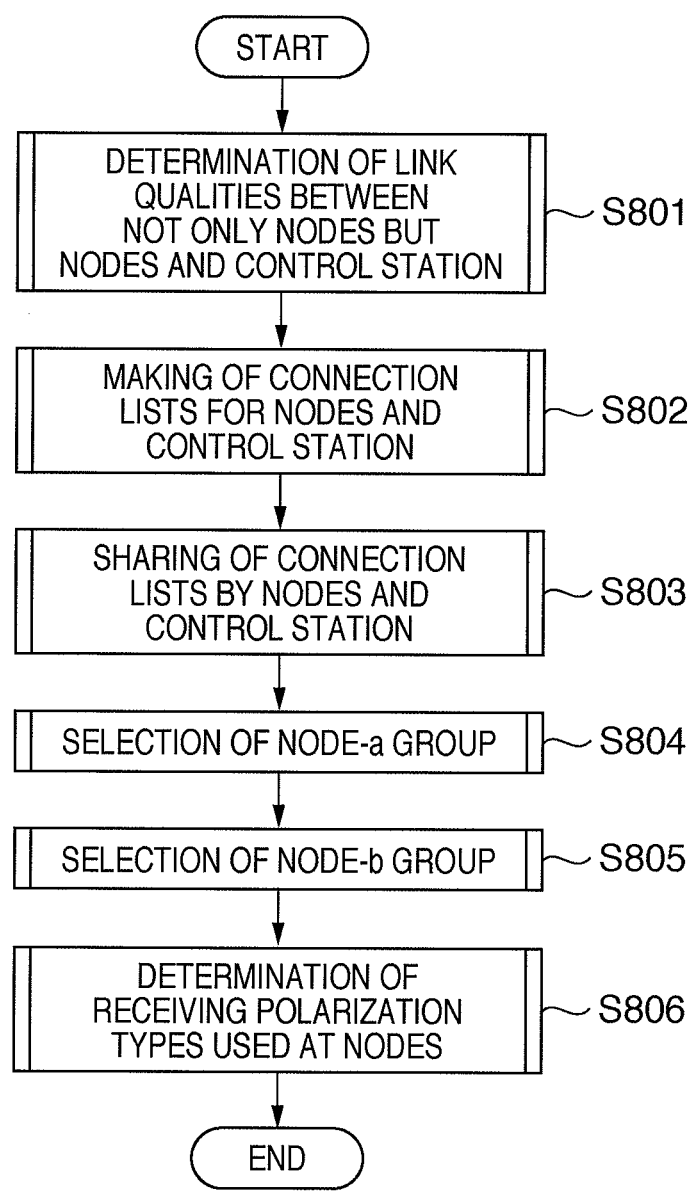
FIG. 8 is a flowchart of a process for determining the order of transmissions from the nodes 101 to 108 at the control station 110.
Figure 9:
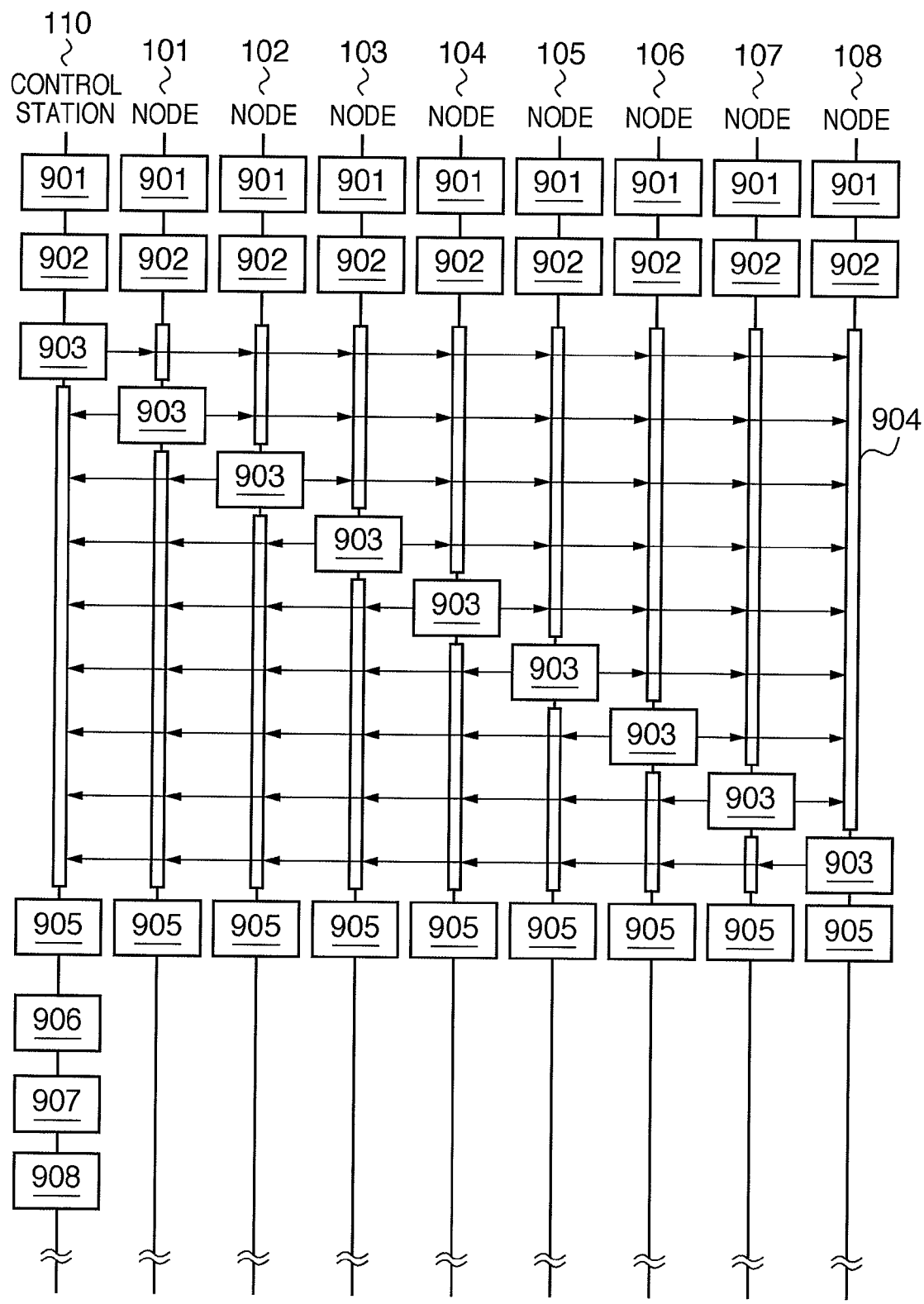
FIG. 9 shows a sequence for the determination of the order of the transmissions from the nodes 101 to 108 at the control station 110.

FIG. 8 is a flowchart of a process for determining the order of transmissions from the nodes 101 to 108 at the control station 110. FIG. 9 shows a sequence of such a determination of the order of transmissions from the nodes 101 to 108 made at the control station 110.

Through communications between not only the nodes 101 to 108 but each node and the control station 110, the link quality-determining units 506 and 406 determine their link qualities (S801 and 901). Thereafter, the processing unit for system control 407 of the control station 110 and the data-processing units 507 of the nodes 101 to 108 make respective connection lists (S802 and 902). The nodes 101 and 108 and the control station 110 share the connection lists through their communications (S803, 903, and 904) and store them in their memories (905).

Since topologies are not yet formed between each node and the control station 110 at that time, the foregoing high-reliability communication method using the RTS/CTS scheme is used to reliably share the data.

The control station 110 determines the order of transmissions from the nodes based on the connection lists for all the nodes 101 to 108 and the control station 110 itself. As the nodes to transmit with, the processing unit for system control 407 of the control station 110 selects the nodes that have high link qualities with respect to the control station 110 itself based on the connection lists; a node to transmit with selected through such a process is referred to as a node a1 (S804 and 906).

Further, a node a2 to transmit at the next time slot is selected. As the node a2 to transmit at the next time slot, selected is a node that is capable of reliably receiving data except the node a1 that has transmitted at the previous time slot and the control station 110 and that is the longest way from the control station 110. At that time, the thresholds of the link qualities presented in the connection lists are set beforehand in order to determine whether communications with the control station 110 can be conducted reliably.

Specifically, their link qualities, through which data can be decoded accurately at the time of communications between the nodes, are determined based on the error occurrence rates of received data and the error correction rates of the error-correcting codes of the data, following which the setting of the thresholds of the determined qualities is conducted. In this case, the threshold of the link quality at which received data can be accurately decoded is set to "7".

The nodes to transmit at the next and subsequent time slots are also selected by using the same method as that described above. In addition, the node a1, the node a2, and the nodes to transmit with selected in subsequent selection processes are collectively referred to herein as a node-a group.

Then a node-b group, which transmit simultaneously using polarizations different from those used by the node-a group at respective time slots, are selected (S805 and 907). After the selection of the node-a group and the node-b group to transmit data, the processing unit for system control 407 of the control station 110 determines the type of polarization to be used by each node to receive data (S806 and 908). At that time, the control station 110 compares the link qualities ensured in the case where the node-a group and the node-b group transmit data by using predetermined transmitting polarizations through reference to the connection lists for the nodes to receive, and then determines the same polarization type as the better transmitting polarization type and as a receiving polarization type.

Incidentally, a method for selecting the node-b group will be described in detail below. In addition, the respective process steps in the flowchart in FIG. 8 are collectively referred to hereinafter as training for the sake of convenience.

Next, a first method for selecting the node-b group to transmit concurrently with the node-a group by using polarizations different from those used by the node-a group will be described. A second method for selecting the node-b group will be described in a second embodiment.

Figure 10:
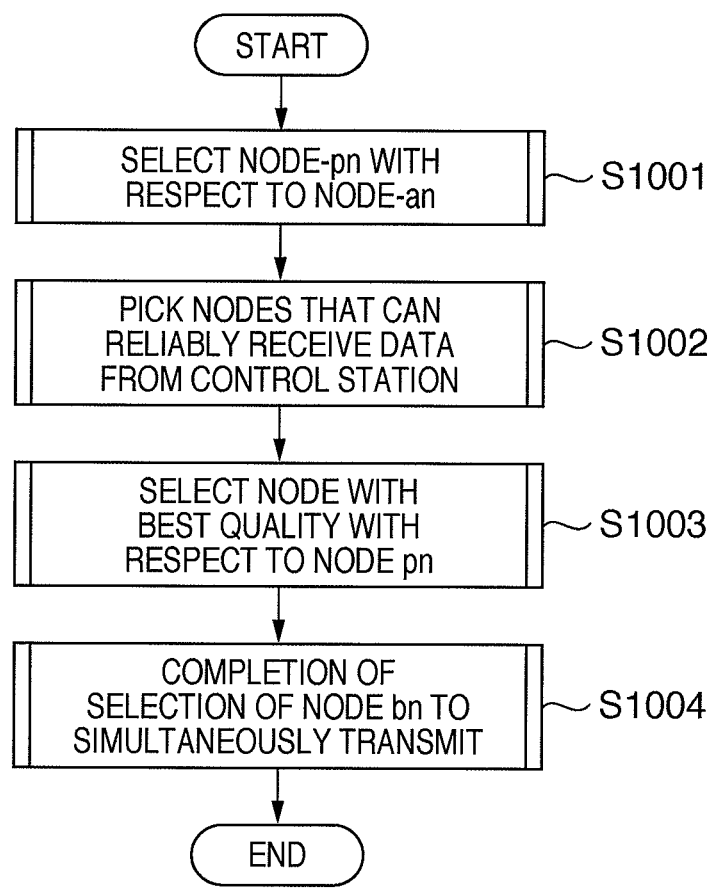
FIG. 10 is a flowchart of a method for selecting a node-b group to simultaneously transmit with different polarizations according to the first embodiment.

FIG. 10 is a flowchart of the method for selecting the node-b group to simultaneously transmit with by using different polarizations according to the first embodiment. FIGS. 11A to 11C show lists used to select the node-b group according to the first embodiment. In FIGS. 11A to 11C, respective components which are the same as those presented in the connection lists of FIGS. 6A to 6C are given the same reference numerals.

Before the description of the method for selecting the node-b group, a method for selecting the node-a group by using the connection lists shown in FIGS. 11A to 11C will be described below. To begin with, since the node a1 has the best link quality with respect to the control station 110, attention is given to the link quality of each node with respect to the control station 110. In the examples shown in FIGS. 11A to 11C, considering the combination of the node and the polarization indicating the best link quality based on reference numerals 1101 to 1103, a combination of the node 101 and the control station 110 using a vertically polarizations represents the best link quality "8" and, thus, the node 101 is selected for the node a1.

Next, the method for selecting the node-b group will be described with reference to FIGS. 10 and 11A to 11C. First, a process for selecting a node b1 to transmit concurrently with the node a1 to transmit at a first slot will be described with reference to FIG. 10.

The control station 110 refers to the connection list for the node a1 to transmit with selected using the foregoing method.

Incidentally, in FIG. 10, the node a1 corresponds to the node 101 that uses a vertically polarization (V). And further, the letter "n" in FIG. 10 denotes the order of a time slot for transmission. In the following explanation, attention is given to the selection of the node to transmit at a first time slot; incidentally, the letter "n" expresses the numeric "1" that represents a first transmission order for the convenience of explanation.

Then the control station 110 selects a node p1 with the worst link quality through the connection list for the node a1 (S1001); note that the node p1 is of the worst link quality with respect to a polarization transmitted from the node a1. This process will be explained below with reference to FIGS. 11A to 11C.

In order to select the node p1, attention is given to the connection list for the node 101 as the node a1. That is, since the node 101 transmits by the use of a vertically polarization (V), the node p1 is the node 106 (1104) that is of the worst link quality "1" among the nodes using vertically polarizations (V) of FIG. 11A.

Then the control station 110 picks the nodes whose link qualities represent values not less than the threshold and which are capable of reliably receiving data from the control station 110 from the connection lists for the nodes other than the node a1 (S1002). Thereafter, the node having the best link quality with respect to the node p1 is selected from the picked nodes (S1003). Here, the picked nodes are the nodes that transmit by using a polarization different from that used by the node a1. The selected node is used as the node b1 that transmits concurrently with the node a1 with a polarization different from that used by the node a1 (S1004). This operation will be described below with reference to FIGS. 11A to 11C.

In FIGS. 11A to 11C, the node 106 is used as the node p1. And further, since the node 101 as the node a1 transmits data with a vertically polarization (V), it is necessary for the node b1 to transmit data with a horizontally polarization (H).

In order to select the node having the best link quality with respect to the node 106 under these conditions, attention is given to the link qualities brought about when the nodes other than the node 101 transmit to the node 106 with horizontally polarizations (H). As can be seen from the connection lists presented as FIGS. 11A to 11C, the link quality between the nodes 102 and 106 is "5" as indicated by the reference numeral 1105, and the link quality between the nodes 104 and 106 is "8" as indicated by the reference numeral 1106.

Moreover, since it is necessary for the node to be selected to reliably receive data from the control station 110, there is also a need to check the level of its link quality with respect to the control station 110. That is, the link qualities between the node 102 and the control station 110 indicated by reference numeral 1102 are "6" when using a horizontally polarization and "4" when using a vertically polarization. On the other hand, the link qualities between the node 104 and the control station 110 indicated with reference numeral 1103 are "7" when using a horizontally polarization and "6" when using a vertically polarization. Since the threshold of the link quality level at which received data can be decoded is "7", the node 102 cannot receive data from the control station 110 accurately. In contrast, the node 104 can accurately receive data transmitted from the control station 110 by using a horizontally polarization.

From the above, it can be seen that the node 104 has the best link quality with respect to the node 106, and can accurately receive data from the control station 110. The node 102 cannot receive data from the control station 110 accurately, and is also inferior to the node 104 in link quality with respect to the node 106. Therefore the node 104 is selected for the node b1.

Up to this point the method for selecting the node b1 has been described; a node b2 that transmits concurrently with transmission by a node a2 and nodes bn that transmit at subsequent time slots will also be selected using such a method. The above is the description of the training that includes the method for selecting node b.

Next, a series of procedures and operations including training performed by the control station 110 and the node 101 to 108 until they finish data transmissions will be described below.

Figure 12:
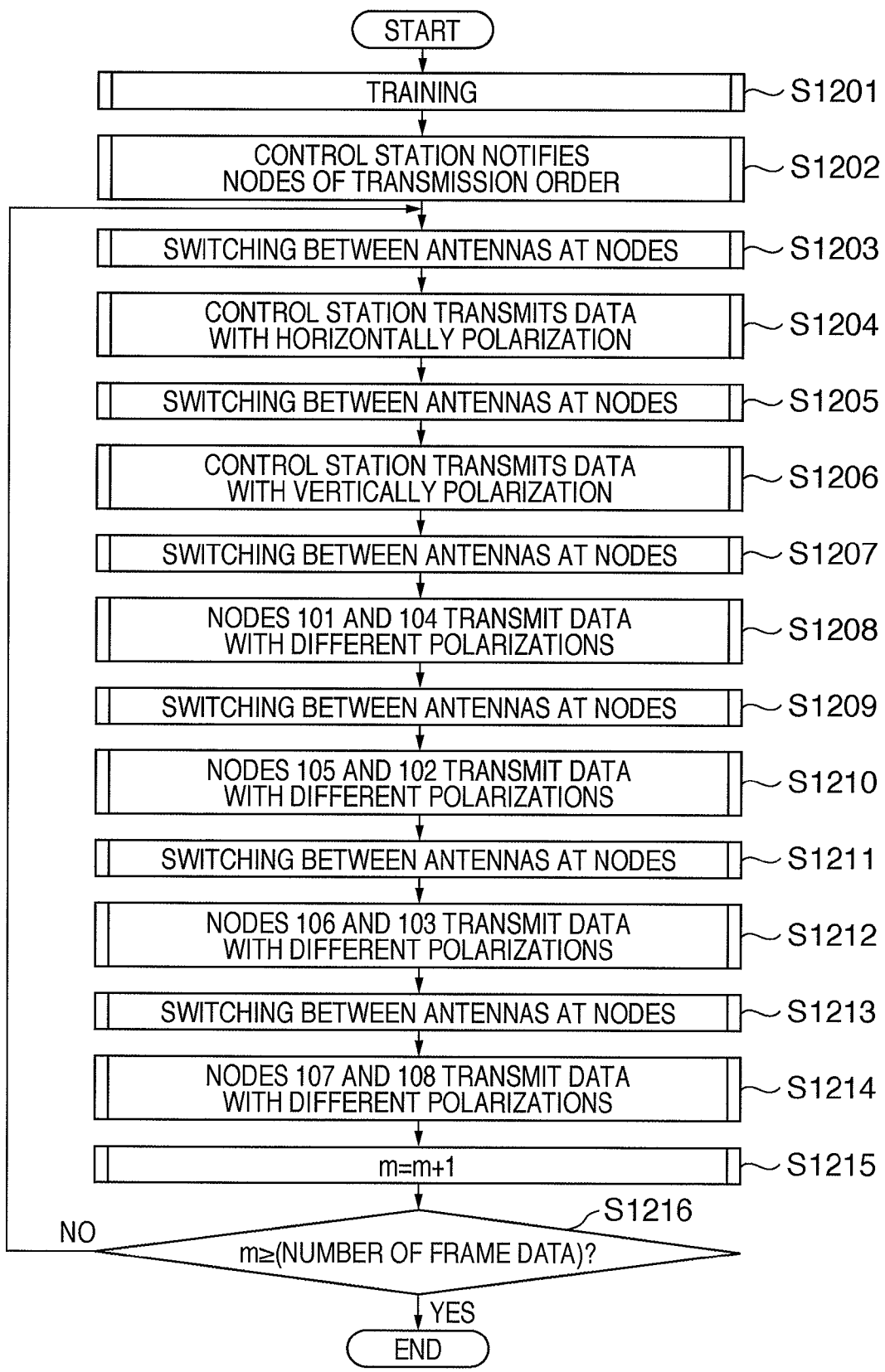
FIG. 12 is a flowchart of operations performed by the nodes 101 to 108 and the control station 110 until they finish data transmissions.

FIG. 12 is a flowchart of operations performed by the nodes 101 and 108 and the control station 110 until they finish data transmissions. In FIG. 12, the letter "m" represents the number of transmissions made in the form of redundant frames. The communication system transmits streamed data using redundant frames. The control station 110 divides streamed data from the external interface 408 into plural pieces of frame data to transmit them.

Figure 13:
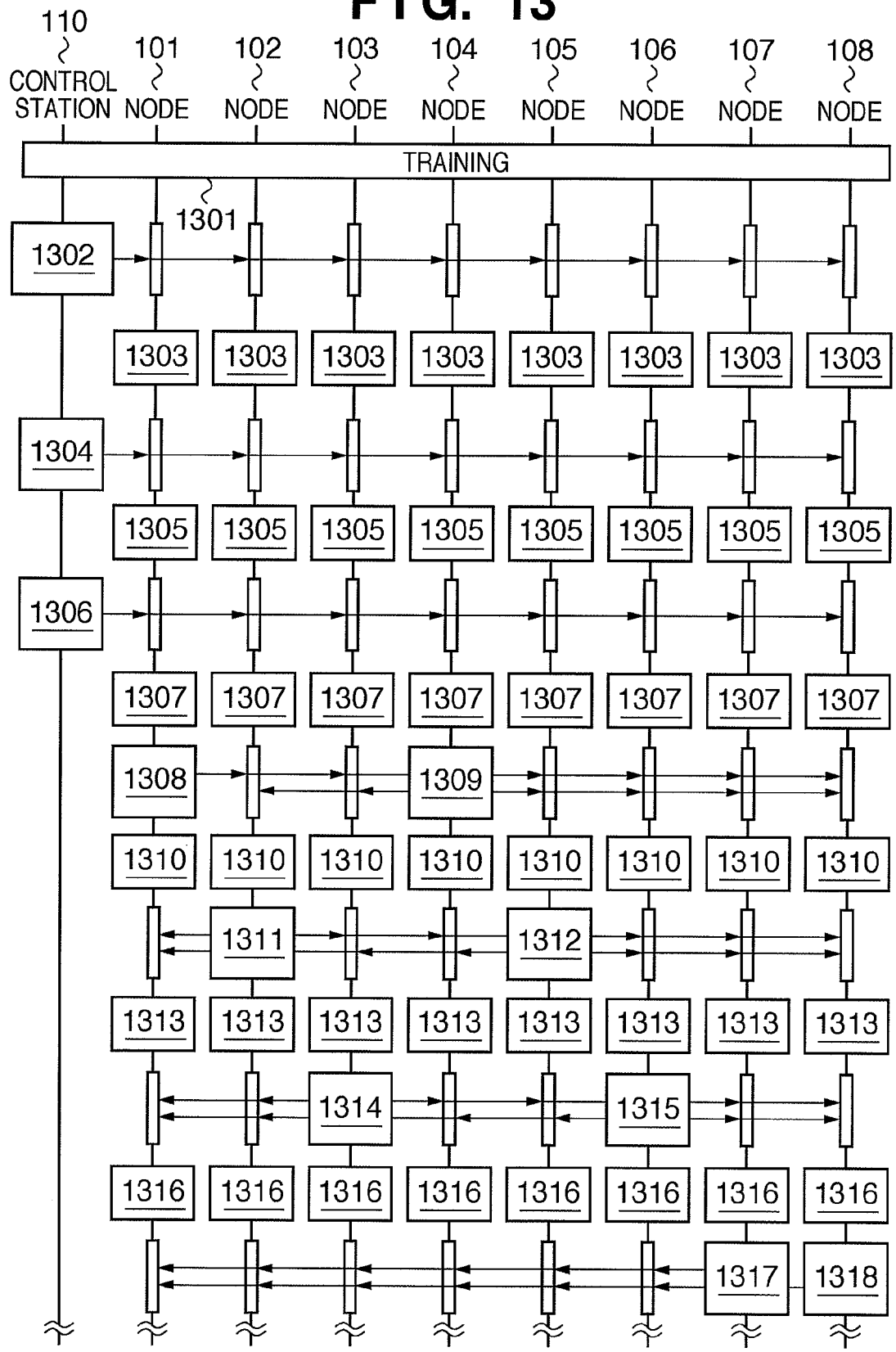
FIG. 13 shows an operation sequence performed by the nodes 101 to 108 and the control station 110 until they finish data transmissions.

FIG. 13 shows an operation sequence performed by the nodes 101 and 108 and the control station 110 until they finish data transmissions. FIG. 14 shows lists of transmitting polarization types and receiving polarization types used by the nodes at plural time slots obtained as a result of training.

To begin with, the nodes 101 and 108, and the control station 110 conduct the training described earlier (S1201 and 1301). As a result of the training a node-a group is selected, which transmit in turn at a first time slot to a fourth time slot as per the order of transmissions from the respective nodes, and a node-b group that transmits concurrently with the transmissions by the node-a group; and furthermore the receiving polarization types used by the reception-side nodes at the respective time slots are also determined.

Information on the order of transmissions from the transmission-side nodes, the transmitting polarization types used by the transmission-side nodes, and the receiving polarization types used by the reception-side nodes at the respective time slots determined through the training is hereinafter referred to as the "training results" collectively. The training results are, as shown in FIG. 14, list-format control data. In FIG. 14, only the training results brought about at the first and second time slots are shown; although not shown in the figure, training effects brought about at the third and fourth time slots are also listed.

The lists of the training results comprises node name 1401, transmitting polarizations used by the nodes 1402, and receiving polarizations used by the nodes 1403; the nodes transmit and receive with predetermined polarizations presented in the list of the training results at the respective time slots.

Next, the control station 110 notifies the nodes of the training results (S1202 and 1302). Since the topology of the communication system is not yet formed at this point in time, the information on the order of the transmissions from the nodes is transmitted by using the same transmission method as that used in the case where the link quality lists are shared.

Each node determines from the notification of the training results that the control station 110 is to initially transmit streamed data with a horizontally polarization, and then switches between the two antennas so as to receive the horizontally polarization (S1203 and 1303). The control station 110 transmits streamed data with a horizontally polarization, and the nodes receive the streamed data with horizontally polarizations (S1204 and 1304).

Then each node switches to the antenna that can receive a vertically polarization based on the training results (S1205 and 1305). The control station 110 transmits streamed data with a vertically polarization, and the nodes receive the streamed data with vertically polarizations (S1206 and 1306).

After completion of the streamed data transmissions from the control station 110, each node switches between the antennas based on the training results (S1207 and 1307). The node 101 transmits data with a vertically polarization, and the node 104 transmits data to the shadow area resulting from the placement of the node 101 by using a horizontally polarization (S1208, 1308, and 1309). Incidentally, the other nodes receive data from either the node 101 or the node 104 that has been sent from the control station 110 by using a specific polarization based on the training results sent from the control station 110.

Thereafter, as in the case of the operations performed at the foregoing time slots, the specified two nodes transmit data based on the transmission order data sent from the control station 110, and the other reception-side nodes receive the data from either of the two nodes by using a specific polarization. Incidentally, these operations are included in the flowchart as S1209 to S1214 and 1310 to 1318.

After transmission and reception of the data by the control station 110 and the nodes 101 to 108 have been completed at all the time slots in one redundant frame, the number of redundant frames "m" is incremented (S1215). When the number of transferred redundant frames "m" is equal to the number of divided frames of data of the streamed data (YES in S1216), data transmission is completed. In contrast, when they are different (NO in S1216), the transmission of the streamed data is not yet completed; therefore, a return to S1203 is made and the order of the transmissions at the respective time slots is kept to transmit the next redundant frame data.

Incidentally, redundant data transmissions have heretofore been made without multiplexing radio waves until all nodes can receive them. In the first embodiment, when compared with such conventional transmission, it is possible to reliably increase the number of nodes that can receive streamed data correctly at four time slots subsequent to the transmission of the original streamed data from the control station 110 and, therefore, its reliability can be increased with a smaller number of communications.

Moreover, when compared with related transmission methods, redundancy can be reduced and the efficiency of channel usage can be doubled through the use of the method of the embodiment in which to the shadow area resulting from the placement of one transmission-side node, another node simultaneously transmits data with different polarizations.

Second Embodiment

A second embodiment of the present invention will be described in detail below with reference to the drawings. In the second embodiment, a method for selecting the node-b group, which differs from the first embodiment method, will be described.

Figure 15:
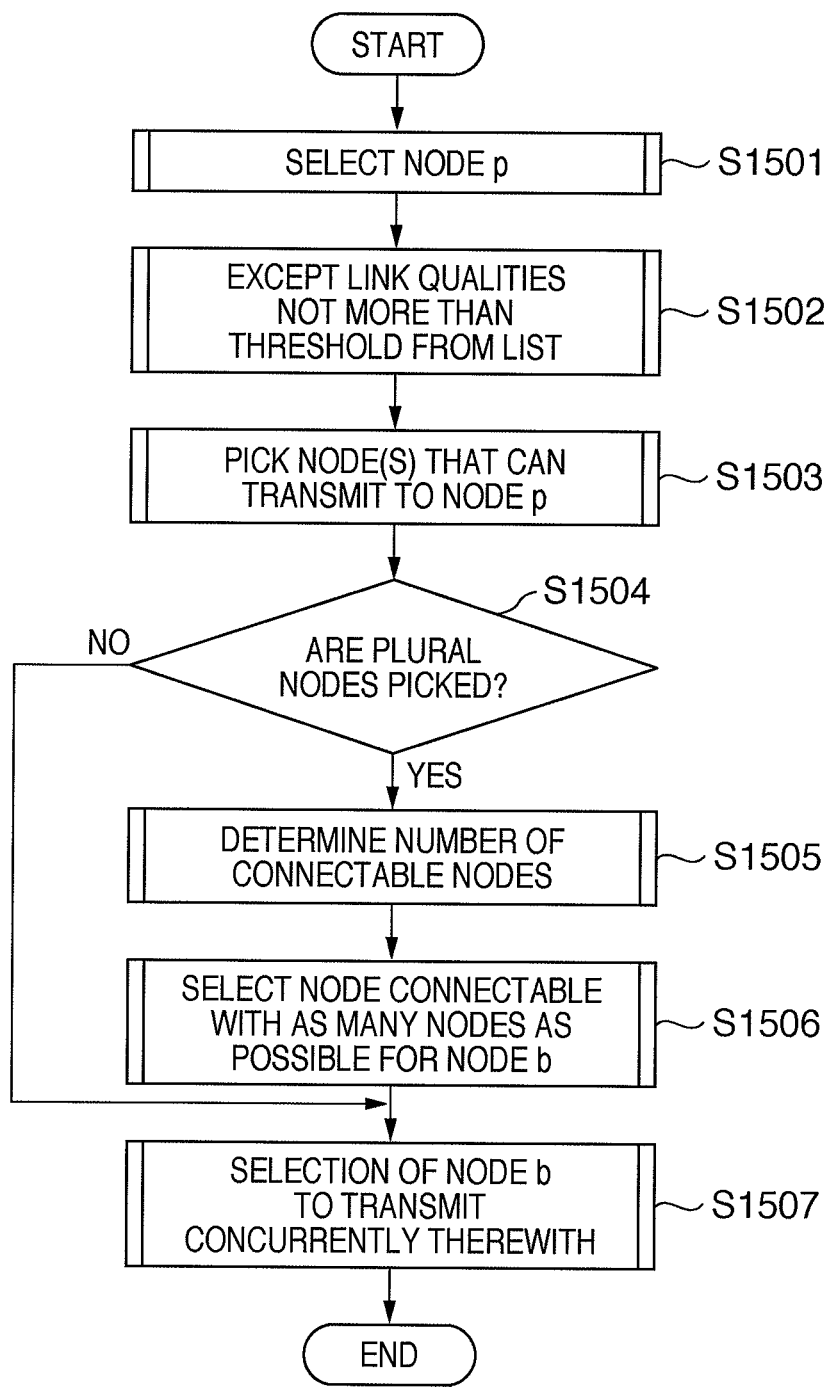
FIG. 15 is a flowchart of a method for selecting the node-b group to transmit with different polarizations simultaneously according to the first embodiment.
Figure 16:
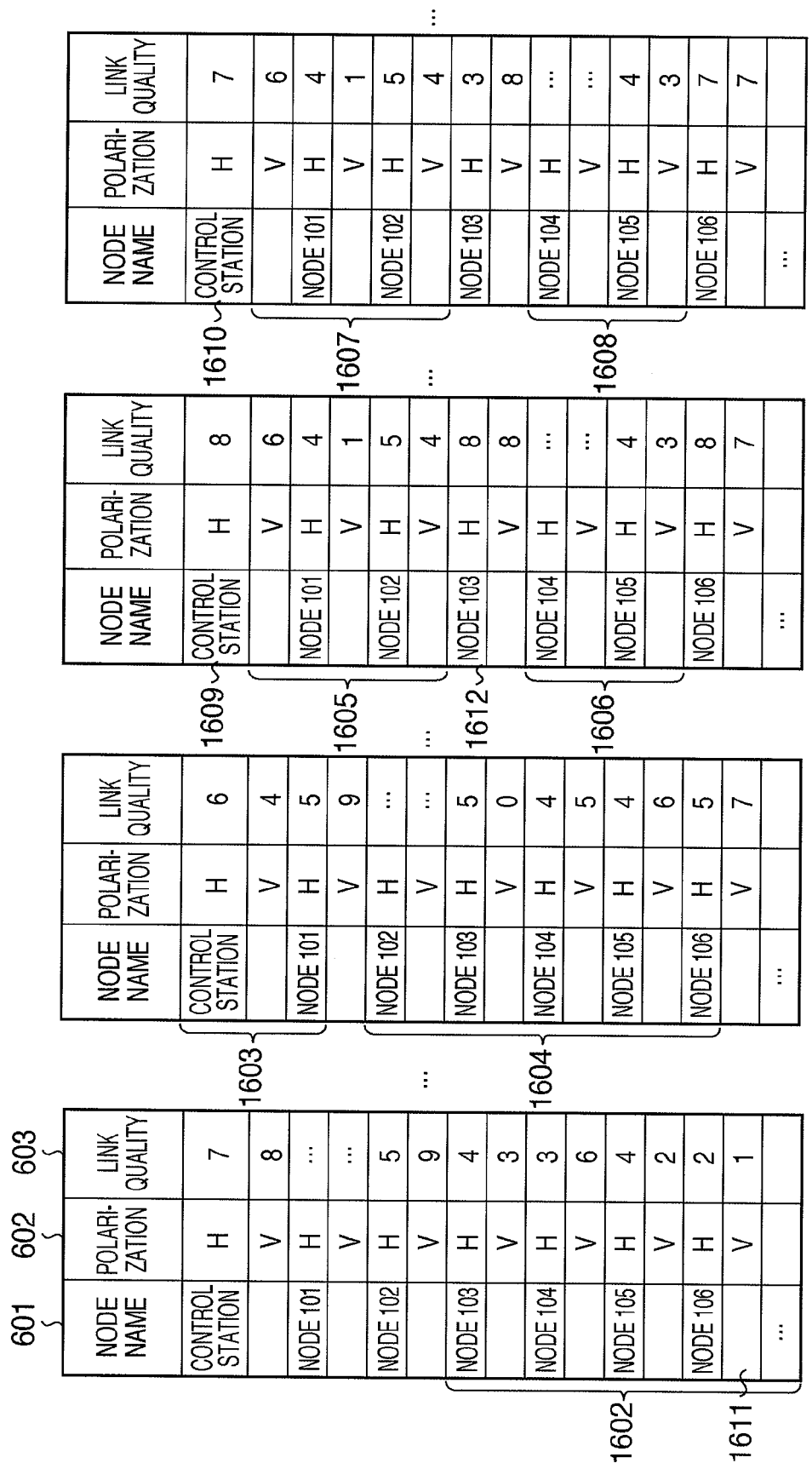
FIGS. 16A to 16D are examples of connection lists used to select the node-b group according to a second embodiment.

FIG. 15 is a flowchart of the first embodiment method for selecting the node-b group that transmits with different polarizations simultaneously. FIGS. 16A to 16D are examples of connection lists used to select the node-b group according to the second embodiment. Incidentally, a method for selecting the node-a group, the procedure of training, and a procedure by which the nodes transmit data at respective time slots based on training results are the same as those described in the first embodiment.

The control station 110 refers to a connection list for the transmission-side node a1 selected by using the same method as that used in the first embodiment. Incidentally, in FIG. 15, as in the case of the first embodiment, the node a1 corresponds to the node 101 that uses a vertically polarization (V).

Then the control station 110 selects a node p with the worst link quality by referring to the connection list for the node a1 (S1501); note that the node p is the node with the worst link quality with respect to a polarization transmitted from the node a1. This operation will be explained below with reference to FIGS. 16A to 16D.

In order to select the node p, attention is given to the connection list for the node 101 as the node a1. That is, since the node 101 transmits with a vertically polarization (V), the node p is the node 106 (1611) having the worst link quality "1" among the nodes that uses vertically polarizations (V) of FIG. 16A.

Next, the control station 110 conducts a process for excepting from the connection lists information on the nodes with a link quality level not more than a threshold predetermined from the link qualities in the connection lists (S1502). To begin with, the threshold of the minimum link quality required to conduct communications between the nodes is set to "7" in advance. Then information on the nodes with a link quality level below the threshold "7" (reference numerals 1602 to 1608 in FIGS. 16A to 16D) is excepted from the connection lists.

Thereafter, the control station 110 picks the node(s) that can communicate with the node p and can reliably receive data from the control station 110 from the connection lists subjected to the exception process in S1502 (S1503). At that time, the node to be picked is the node that transmits with a polarization different from that used by the node a1.

Furthermore, the control station 110 determines how many nodes have been picked from them (S1504). When one of them has been picked, the node is selected as a node b (S1507).

In contrast, when more than one of them has been picked, the nodes connectable therewith are counted using the connection list for each node picked (S1505). That is, only the nodes connectable therewith with a polarization different from that used by the node a1 are counted. Then the numbers of nodes connectable with the picked nodes are compared, and the node that can be connected with as many of the nodes as possible is selected as the node b (S1506). This operation will be described below with reference to FIGS. 16A to 16D.

In FIGS. 16A to 16D, the node 106 is used as the node p. Since the node 101 as the node a1 transmits with a vertically polarization (V), it is necessary for the node b to transmit with a horizontally polarization (H).

In order to select the node that can communicate with the node 106 under these conditions, attention is given to the link qualities displayed when nodes other than the node 101 transmit to the node 106 with a horizontally polarization (H). From the connection lists shown in FIGS. 16A to 16D, it can be seen that although the node 102 of FIG. 16B can communicate with the node 106, their combination is not within the conditions set because its link quality with respect to the control station 110 is excepted therefrom. In contrast, the nodes 104 and 105 of FIGS. 16C and 16D can communicate with not only the node 106 but also the control station 110 (see reference numerals 1609 and 1610).

Therefore the nodes 104 and 105 are picked as the nodes that can transmit to the node 106.

Then the node b is selected from the picked nodes 104 and 105. Specifically, attention is given to the connection lists for the nodes 104 and 105; the nodes connectable with the node 104 and those connectable with the node 105 are counted. Note that since the node b transmits with a horizontally polarization, only the nodes connectable when transmitting with a horizontally polarization are counted.

For the node 104, the number of connectable nodes is one (the node 103 represented by reference numeral 1612) except for the control station 110 and the node 106. For the node 105, the number is zero except for the control station 110 and the node 106. Since it can be seen from the above results that the node 104 can also cover the node 103 as well as the node 106, the node 104 is selected as the node b.

Up to this point the method for selecting the node b has been described; the node b that transmits concurrently with the node a and the node b that transmits at subsequent time slots are also selected using the same method as that described above.

The first embodiment has presented a method for reliably covering only the node-p group within the shadow area resulting from placement of the node-a group at the time of the selection of the node-b group, while the second embodiment has presented a method whereby not only the node-p group but also nodes that cannot correctly receive data can be covered. Therefore the reliability of data transmission can be increased in a smaller number of communications.

Third Embodiment

Next, a third embodiment according to the present invention will be described below with reference to the drawings. In the first and second embodiments, the case has been described where two nodes are used, which transmit by using, for example, polarizations as radio wave multiplex types. In the third embodiment, the case will be described where more than two nodes simultaneously transmit data on plural frequencies as radio wave multiplex types.

Figure 17:
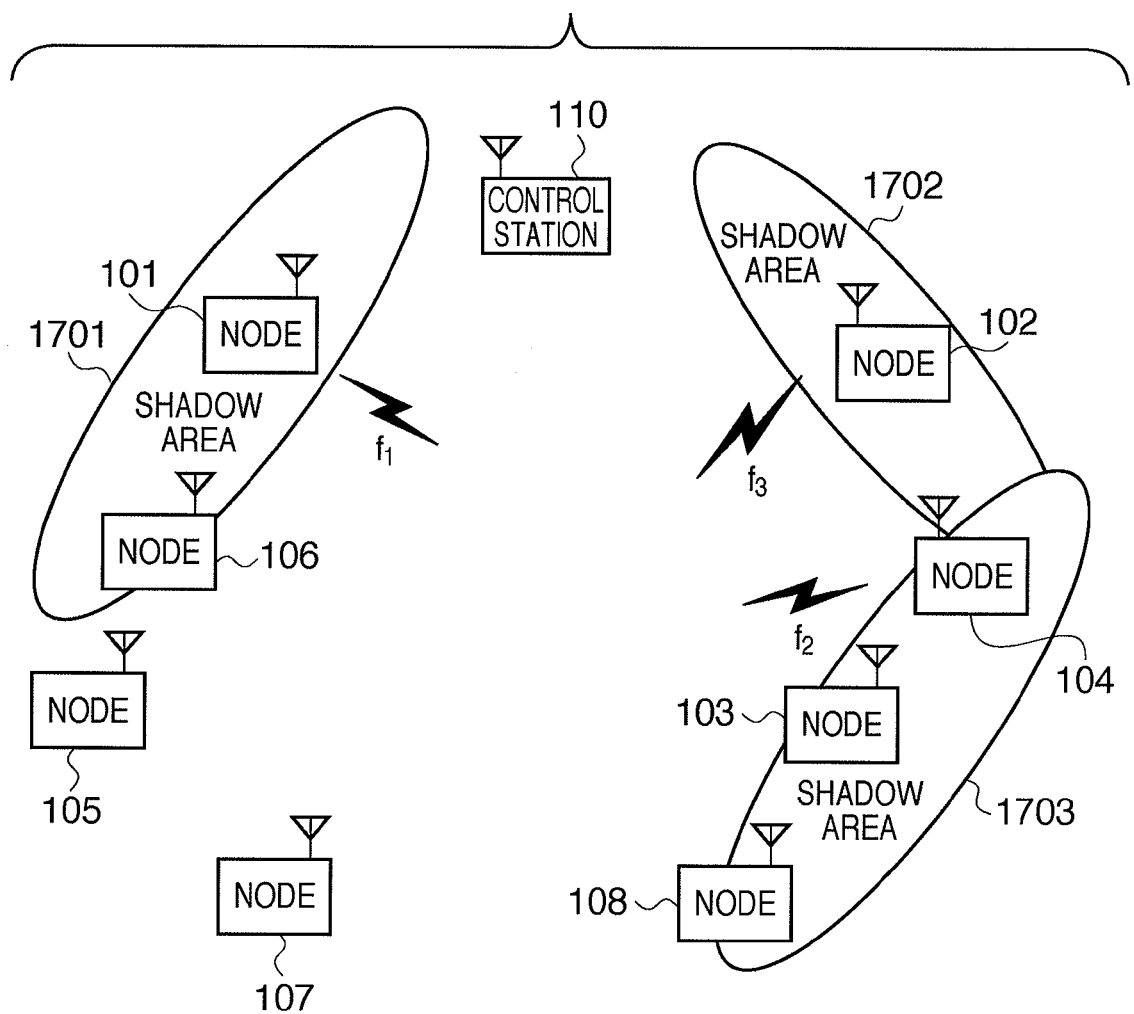
FIG. 17 is an illustration of an exemplary structure of a network according to a third embodiment.

FIG. 17 is an illustration of an exemplary structure of a network according to the third embodiment. In the third embodiment, three transmission-side nodes make multiple data transmissions by using frequencies as different radio wave multiplex types. In this embodiment, the three nodes 101, 104, and 102 simultaneously transmit data on different frequencies f1, f2, and f3. In addition, as in the case of the first embodiment, reference numerals 1701 to 1703 denote shadow areas resulting from the transmission of streamed data from the nodes.

Incidentally, the configurations of the third embodiment control station 110 and nodes 101 to 108 are the same as those described in the first embodiment with reference to FIGS. 4 and 5 and, therefore, their explanation will be omitted.

In the first and second embodiment, different polarizations are created by switching between antenna types; in the third embodiment, the radio communication units 401 and 501 switch between the frequencies of local signals to transmit and receive on frequencies of different bandwidths.

Figure 18:
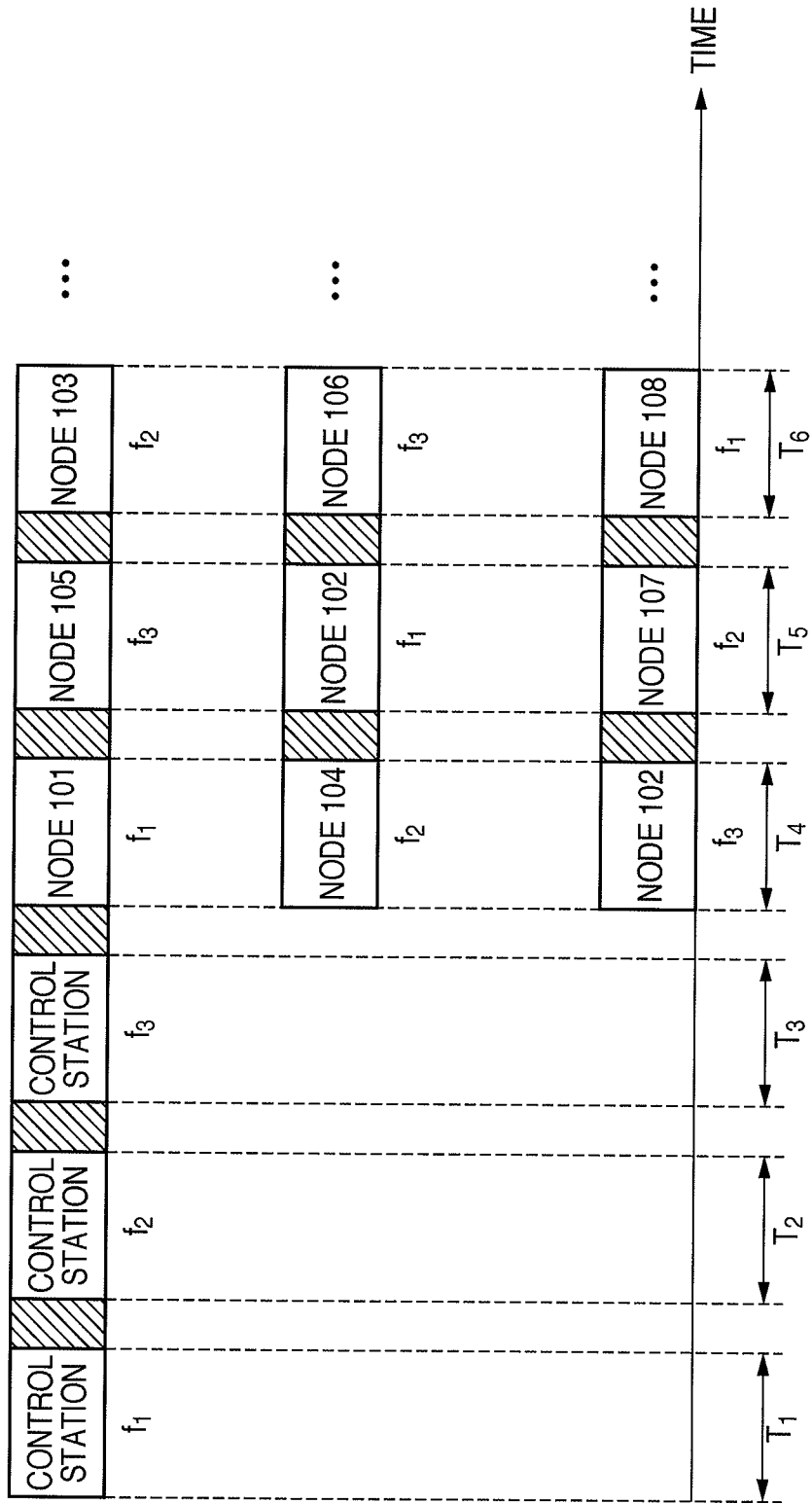
FIG. 18 shows time slots at which the control station 110 and the nodes 101 to 108 transmit data.

FIG. 18 shows time slots at which the control station 110 and the nodes 101 to 108 transmit data. The control station 110 transmits data to all the nodes 101 to 108 at three different frequencies f1, f2, and f3 at time slots T1 to T3. Then, at a time slot T4, the nodes 101, 104, and 102 simultaneously transmit data at frequencies f1, f2, and f3, respectively. At subsequent respective time slots T5 and T6 as well, the three nodes simultaneously transmit data without repeating respective combinations of the transmission frequencies and the nodes.

Figure 19:
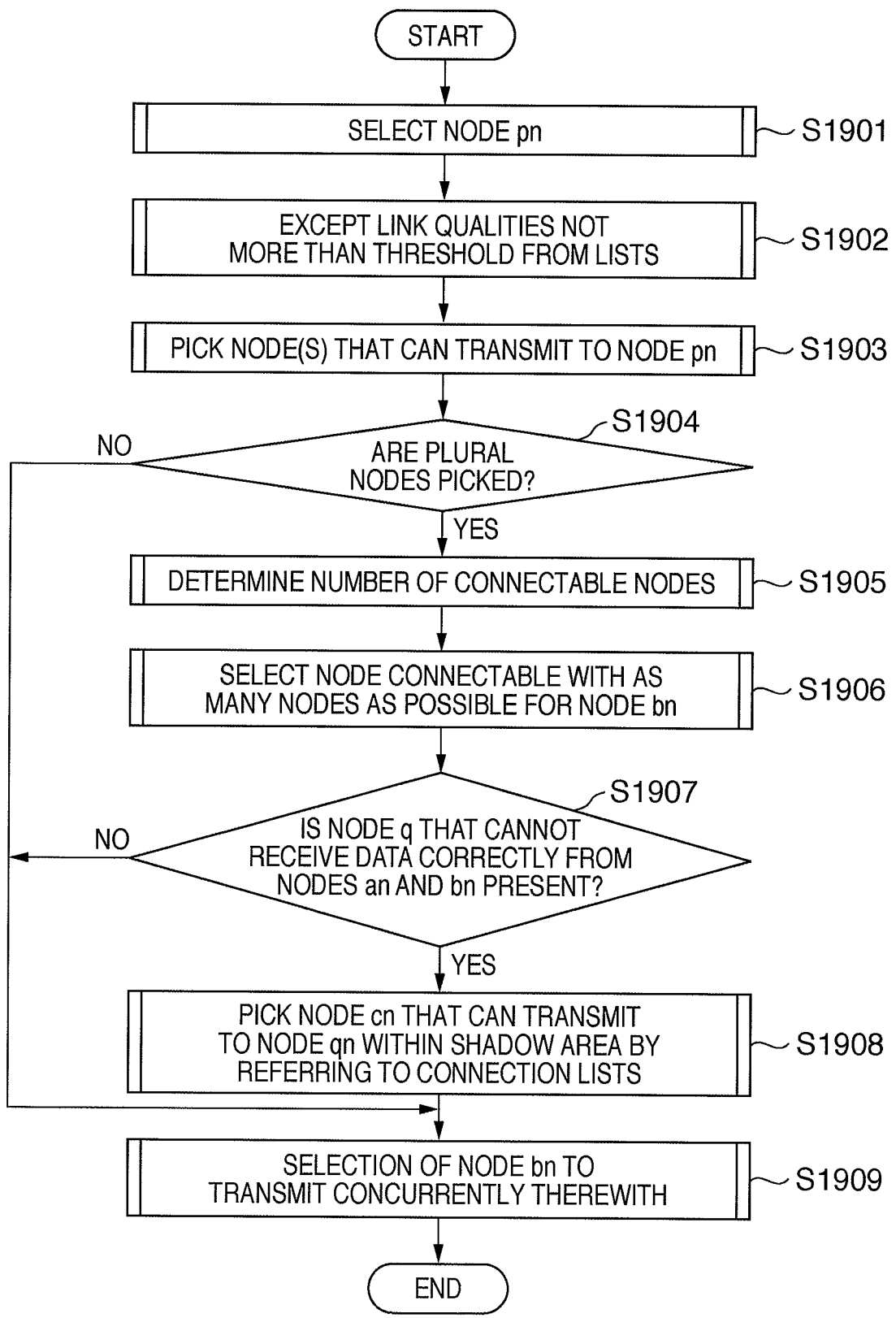
FIG. 19 is a flowchart of a method for selecting the nodes to simultaneously transmit according to the third embodiment.

Next, a method for selecting the three nodes that simultaneously transmit data on the different frequencies will be described below with reference to FIG. 19. FIG. 19 is a flowchart of the third embodiment of a method for selecting the nodes that transmit simultaneously.

In this embodiment, the connection lists needed to select the three nodes that transmit simultaneously are made using the same procedure as that described in the first embodiment except that frequencies are used instead of polarizations as the radio wave multiplex types. And further, since the transmission-side nodes are selected using the same method as that described in the second embodiment, a detailed description of such selection using the connection lists will be herein omitted. Still further, the description of the nodes to transmit with will be made with the assumption that they transmit in the order presented in FIG. 18.

In the third embodiment, as for the node-a group that transmits data, a method for selecting the node-b group and a method for selecting a node-c group, which transmit data simultaneously, will be described. Note that as in the first and second embodiments, the node a1 to transmit at the first time slot after the transmission of data from the control station 110 is the node with the best link quality selected by referring to the connection lists for the nodes and the control station 110. And further, the node a2 to transmit at the second and subsequent time slots is the node that can receive data reliably from nodes other than those that have transmitted at the prior time slot and the control station 110, and that is the longest way from the control station 110. The nodes an to transmit at subsequent time slots are also selected using the same method as that described above. Incidentally, the letter "n", as in the first embodiment, denotes the turn of the node in which to transmit data.

To begin with, the control station 110 refers to the connection list for the selected transmission-side node a1, and selects the node p1 with the worst link quality (S1901). At this time, since the node 101 as the node a1 of FIG. 18 uses the frequency f1, the node p1 is selected based on the link qualities relating to the frequency f1.

Next, the control station 110 sets the threshold of their link qualities presented in the connection lists, and then excepts information on the nodes with link qualities not more than the threshold from the connection lists (S1902). At that time, the threshold is set to a level of their link qualities at which data can be decoded reliably at the time of communications between the nodes. Then the control station 110 picks the node(s) that can communicate with the node 1 based on the frequencies other than the frequency f1 used by the node a1 presented in the connection lists subjected to the exception processing at S1902 (S1903).

Thereafter, the control station 110 determines how many nodes have been picked from them (S1904). When one of them has been picked, the node is used as the node b1.

In contrast, when more than one of them has been picked, the nodes connectable therewith are counted using the connection list for each node picked (S1905); note that the nodes counted are only those connectable therewith on the frequencies f2 and f3 different from the frequency f1 that the node a1 uses.

Next, the numbers of nodes connectable with the respective picked nodes are compared, and then the picked node that can be connected with as many of the nodes as possible is selected as the node b1 (S1906). Incidentally, in FIG. 18, the node b1 is the node 104, which transmits data on the frequency f2.

The operations performed up to this point are the same as those described in the second embodiments; but in the third embodiment, since three nodes can be selected to simultaneously transmit, a node c1 is further selected in order to cover a shadow area resulting from the placement of the nodes a1 and b1. However, when there is no shadow area resulting from the placement of the nodes a1 and b1, there is no need to select the node c1 and, therefore, there are two nodes to transmit with.

Then a determination as to whether there is a node that cannot correctly receive data from the nodes a1 and b1 is made (S1907). Herein, a node within the shadow area resulting from the placement of the nodes a1 and b1 is referred to as a node q1.

As a result of the determination, when the node q1 is present, the control unit 110 picks the node(s) with a good link quality with respect to the node q1 by referring to the connection lists (S1908). When one of the nodes has been picked, the node is used as the node c1.

In contrast, when more than one of them has been picked, the nodes connectable with each picked node are counted using the connection list for each picked node; note that the nodes counted are only those connectable therewith on the frequency f3 different from those used by the nodes a1 and b1.

Thereafter, the numbers of nodes connectable with the respective picked nodes are compared, and the picked node connectable with as many of the nodes as possible is selected as the node c1 (S1909). In FIG. 18, the node c1 is the node 102, which transmits data on the frequency f3.

Moreover, not only nodes b2 and c2 that transmit concurrently with the node a2, but nodes bn and cn that transmit at subsequent time slots are also selected using the same method as that described above.

The foregoing is the node selecting method used when three nodes transmit simultaneously.

Next, a series of procedures and operations including training performed by the control station and the nodes until they finish data transmissions will be described below.

Figure 20:
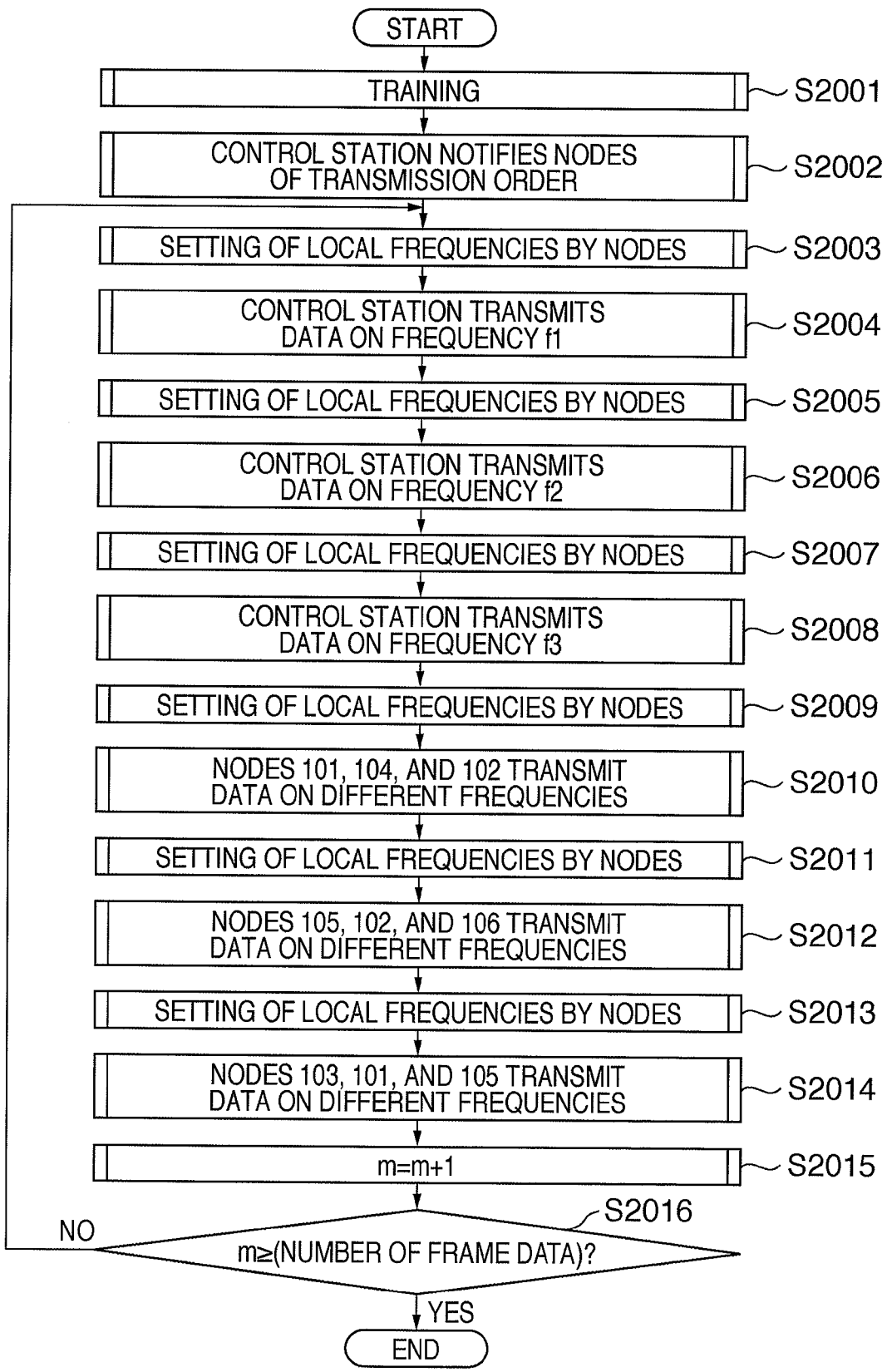
FIG. 20 is a flowchart of operations performed by the control station and the nodes until they finish data transmissions according to the third embodiment.

FIG. 20 is a flowchart of operations performed by the third embodiment control station and nodes until they finish data transmissions. FIG. 21 shows a sequence of the operations performed by the control station and the nodes until they finish data transmissions.

To begin with, the nodes 101 to 108 and the control station 110 conduct training (S2001 and 2101). The control station 110 notifies the nodes 101 to 108 of the training results by using the same transmission method as that used when the link quality lists are shared in the first embodiment (S2002 and 2102).

Each node determines a frequency to be received based on the training results, and then sets the frequency of a local signal (S2003 and 2103).

The control station 110 transmits streamed data on the frequency f1 (S2004 and 2104). During the transmission, each node receives the streamed data. Then each node sets the frequency of a local signal (S2005 and 2105), the control station 110 transmits streamed data on the frequency f2, and then each node receives the streamed data (S2006 and 2106). And further, each node sets the frequency of a local signal (S2007 and 2107), the control station 110 transmits streamed data on the frequency f3, and then each node receives the streamed data (S2008 and 2108).

After the transmission of the streamed data from the control station 110 has finished, each node sets the frequency of a local signal based on the training results (S2009 and 2109). Then the node 101 transmits data on the frequency f1, and the node 104 transmits the data to the shadow area resulting from the placement of the node 101 on the frequency f2. And further, the node 102 transmits the data to the shadow areas resulting from the placement of the nodes 101 and 104 on the frequency f3 (S2010 and 2110). The other nodes receive the data from one of the nodes 101, 104, and 102 on a specific frequency based on transmission order data sent from the control station 110.

Likewise, the specified three nodes transmit data at subsequent time slots based on the transmission order data sent from the control station 110. The other reception-side nodes receive the data from one of the three nodes on a specific frequency (S2011 to S2014 and 2111 to 2114).

After the transmission and reception of data by the control station 110 and the nodes 101 to 108 is finished at all the time slots in the respective redundant frames, the number of redundant frames m is incremented by 1 (S2015). In S2016, when the number of the transmitted redundant frames m is equal to that of the divided frames of the streamed data, the data transmission is finished. In contrast, when they are different, the transmission of the streamed data is not finished; therefore, a return to S2003 is made and the order of the transmissions at the respective time slots is kept to transmit data at the next redundant frame.

In the third embodiment, the three nodes simultaneously transmit data on different frequencies and the shadow area resulting from simultaneous data transmissions made by the two nodes in the first or second embodiment can be covered by the simultaneous transmission of the data from nodes other than the three nodes. Therefore the reliability of data transmission can be further increased in a smaller number of communications.

Another Embodiment

In the first to third embodiments, the types of polarizations or frequencies the nodes receive are determined by the control station based on the training results; however, the polarizations or frequencies to be received may be determined by the nodes. That is, since the respective nodes share the connection lists, a transmission-side node with a good link quality can be selected based on the connection lists by the nodes themselves through the notification of the name of the control station or node that will transmit.

As a result, the respective nodes determine the types of polarizations to be received by the respective nodes and, therefore, the amount of data needed to send the training results can be reduced when compared with that needed in the foregoing embodiments.

Moreover, although the descriptions of the first to third embodiments have been made by taking the case where polarizations and frequencies are used as radio wave multiplex types as an example, a code used in a code system typified by a code division multiple access (CDMA) scheme may be used as a radio wave multiplex type, or a combination of these may be used. Incidentally, since CDMA schemes are well-known techniques, their detailed explanation will not be herein made.

With polarizations, as polarizations not interfering with each other and orthogonal to each other, there are right-handed polarizations and left-handed polarizations as well as vertically polarizations and horizontally polarizations. And further, when codes are used, codes with a low cross-correlation to each other are used. Still further, when frequencies are used, frequencies of different bandwidths are used.

As described above, by using various radio wave multiplex types, flexible communication systems that respond to a radio wave environment can be set up. That is, through the use of different radio wave multiplex types, flexible measures can also be taken against the occurrence of various communication interferences. And further, with regard to the use of polarizations, although such horizontally polarizations and vertically polarizations have been used in the first and second embodiments, the use of the foregoing right-handed and left-handed polarizations makes it possible to reduce the influence of indoor multipaths. Incidentally, since a technique for allowing the reduction of the influence of the multipaths through the use of right-handed and left-handed polarizations is a well-known technique, its explanation will not be herein made.

Moreover, there may be three or more of the nodes that simultaneously transmit data communications. Incidentally, in the case where more than two nodes simultaneously transmit data as well, the nodes are selected using the same algorithm as that of the method for selecting the transmission-side nodes described in the third embodiment.

Through the use of the above method, the reliability of data transmission can be increased in a smaller number of communications when compared with the reliability achieved in the foregoing embodiments.

Although a description of antenna directivity has been made by limiting the description to a transmitting antenna in each embodiment, the case where the receiving antenna has specific antenna directivity is also effective.

According to the embodiments described above, in such communication systems wherein redundant data transmissions are made, more than one node can simultaneously transmit the data to the other reception-side nodes. Because of this, each node can receive data correctly in a smaller number of communications when compared with conventional nodes. And further, in the case where polarizations are used as a radio wave multiplex type, the usage efficiency of such communication channels can be increased.

Incidentally, the present invention may be applied to not only systems each comprised of plural devices (e.g., a host computer, an interface, a reader, and a printer) but apparatuses each comprised of a single unit (e.g., copiers and facsimile machines).

Further, a storage medium is provided to a system or apparatus, in which a software program code implementing the functions according to the foregoing embodiments is stored, and the computers (CPUs or MPUs) of the system or apparatus read the program code stored in the storage medium to execute the program. Therefore, it is needless to say that through such operations, the object of the present invention is attained.

In that case, the program code itself read from the computer-readable storage medium implements the functions according to the foregoing embodiments, and this means that the storage medium in which the program code is stored constitutes the present invention.

As the storage medium to provide the program code, a flexible disk, a hard disk, an optical disk, a magneto-optical disk, a CD-ROM, a CD-R, a magnetic tape, a nonvolatile memory card, a ROM, or the like can be used, for example.

Moreover, it is needless to say that by executing the program read by the computer, the following case results as well as the implementation of the functions according to the foregoing embodiments. That is, an OS (operating system) etc. operating in the computer performs a part of or all of the actual processing of the instructions of the program code and through such performance, the functions according to the foregoing embodiments are implemented.

Furthermore, the program code read from the storage medium is written into a memory provided to an expanded capability board inserted into a computer or an expanded capability unit connected to a computer. Thereafter, a CPU etc. provided to the expanded capability board or the expanded capability unit perform a part of or all of the actual processing of the instructions of the program code and, therefore, it is needless to say that the case also arises that through such performance, the functions according to the foregoing embodiments are implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-099804, filed Apr. 7, 2008, which is hereby incorporated by reference herein in its entirety.

What is claimed is:

1. A communication apparatus in a communication system comprised of a plurality of communication apparatuses, the communication apparatus comprising:
a first determination unit configured to determine one or more first communication apparatuses within a shadow area of a second communication apparatus using a first radio wave multiplex type, wherein the shadow area is a low link quality area;
a second determination unit configured to determine a third communication apparatus to transmit data to the one or more first communication apparatuses by data transmission using a second radio wave multiplex type different from the first radio wave multiplex type,
wherein the second determination unit determines the third communication apparatus that has link qualities with the one or more first communication apparatuses being equal to or higher than a threshold, and
wherein the second communication apparatus and the third communication apparatus concurrently transmit data using the first radio wave multiplex type and the second radio wave multiplex type, respectively;
wherein the link qualities are based on a received signal intensity, a bit error rate, or a frame error rate detected at each communication apparatus when the multiple data transmissions have been performed using two different radio wave multiplex types orthogonal to each other.

2. The apparatus according to claim 1, wherein when there are plural first communication apparatuses within the shadow area of the second communication apparatus, the second determination unit determines the third communication apparatus based on the number of the plural first communication apparatuses connectable with the third communication apparatus.

3. The apparatus according to claim 1, wherein a timing with which the second and third communication apparatuses transmit data is determined based on the link qualities.

4. The apparatus according to claim 1, wherein the data transmission using the second radio wave multiplex type is any one of multiple data transmissions using a horizontally polarization and a vertically polarization, multiple data transmissions using a code division multiplex system, and multiple data transmissions using a frequency division multiplex system.

5. The apparatus according to claim 1, further comprising a switching unit configured to switch between the radio wave multiplex types according to a predetermined timing.

6. The apparatus according to claim 1, further comprising a third determination unit configured to determine the radio wave multiplex types for use in the data transmission.

7. The apparatus to claim 6, wherein the third determination unit determines a radio wave multiplex type for use in reception of data transmitted through the data transmission.

8. The apparatus according to claim 6, wherein the third determination unit determines a radio wave multiplex type for use in transmission of data transmitted through the data transmission.

9. The apparatus according to claim 6, further comprising a switching unit configured to switch between the radio wave multiplex types according to a predetermined timing,
wherein the third determination unit determines the radio wave multiplex types with a timing of switching by the switching unit.

10. The apparatus according to claim 1, further comprising a measurement unit configured to measure link qualities with respect to other communication apparatuses at each communication apparatus,
wherein results obtained by measuring the link qualities with respect to the other communication apparatuses at each radio wave multiplex type are shared by the plurality of communication apparatuses.

11. The apparatus according to claim 1, wherein at least a part of the plurality of communication apparatuses relays received data to other communication apparatuses.

12. The apparatus according to claim 1, further comprising a fourth determination unit configured to determine the order of relay of relaying data.

13. A data transmitting method of a communication apparatus in a communication system comprised of a plurality of communication apparatuses, the method comprising:
determining one or more first communication apparatuses within a shadow area of a second communication apparatus using a first radio wave multiplex type, wherein the shadow area is a low link quality area;
determining a third communication apparatus to transmit data to the one or more first communication apparatuses by data transmission using a second radio wave multiplex type different from the first radio wave multiplex type,
wherein the third communication apparatus is determined such that the third communication apparatus has link qualities with the one or more first communication apparatuses being equal to or higher than a threshold, and
wherein the second communication apparatus and the third communication apparatus concurrently transmit data using the first radio wave multiplex type and the second radio wave multiplex type, respectively;
wherein the link qualities are based on a received signal intensity, a bit error rate, or a frame error rate detected at each communication apparatus when the multiple data transmissions have been performed using two different radio wave multiplex types orthogonal to each other.

14. A non-transitory computer-readable storage medium on which a program for causing a computer to execute the data transmitting method according to claim 13 has been stored.

* * * * *